US010115127B2

(12) United States Patent
Nomura et al.

(10) Patent No.: US 10,115,127 B2
(45) Date of Patent: Oct. 30, 2018

(54) INFORMATION PROCESSING SYSTEM, INFORMATION PROCESSING METHOD, COMMUNICATIONS TERMINALS AND CONTROL METHOD AND CONTROL PROGRAM THEREOF

(71) Applicants: Toshiyuki Nomura, Tokyo (JP); Akio Yamada, Tokyo (JP); Kota Iwamoto, Tokyo (JP); Ryota Mase, Tokyo (JP)

(72) Inventors: Toshiyuki Nomura, Tokyo (JP); Akio Yamada, Tokyo (JP); Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 14/365,955

(22) PCT Filed: Dec. 12, 2012

(86) PCT No.: PCT/JP2012/082230
§ 371 (c)(1),
(2) Date: Jun. 16, 2014

(87) PCT Pub. No.: WO2013/089146
PCT Pub. Date: Jun. 20, 2013

(65) Prior Publication Data
US 2014/0310097 A1    Oct. 16, 2014

(30) Foreign Application Priority Data
Dec. 16, 2011 (JP) ................... 2011-276524

(51) Int. Cl.
G06Q 30/02    (2012.01)
G06K 9/00    (2006.01)
(Continued)

(52) U.S. Cl.
CPC ... *G06Q 30/0251* (2013.01); *G06F 17/30321* (2013.01); *G06K 9/00664* (2013.01);
(Continued)

(58) Field of Classification Search
CPC .............................. G06Q 30/00; G06Q 30/02
See application file for complete search history.

(56) References Cited

U.S. PATENT DOCUMENTS 6,282,713 B1    8/2001    Kitsukawa et al.
6,711,293 B1    3/2004    Lowe
(Continued)

FOREIGN PATENT DOCUMENTS

JP    2002-278857 A    9/2002
JP    2002-534017 A    10/2002
(Continued)

OTHER PUBLICATIONS

International Search Report, Corresponding to PCT/JP2012/082230, dated Feb. 5, 2013, 2 pages.
(Continued)

*Primary Examiner* — Marilyn G Macasiano
(74) *Attorney, Agent, or Firm* — Wilmer Cutler Pickering Hale and Dorr LLP

(57) ABSTRACT

Advertisement information relating to an object is provided in real time, while capturing images of the object. m first local features which are respectively feature vectors from one dimension to i dimensions are stored in association with an object, n feature points are extracted from a video picture, n second local features which are respectively feature vectors from one dimension to j dimensions are generated, the smaller number of dimensions is selected, of the number of dimensions i and the number of dimensions j, and an object is recognized to be present in the video picture and advertisement information relating to that object is provided when
(Continued)

determination is made that at least a prescribed ratio of the m first local features of the selected number of dimensions corresponds to the n second local features of the selected number of dimensions.

9 Claims, 30 Drawing Sheets

(51) Int. Cl.
 *G06K 9/46* (2006.01)
 *G06F 17/30* (2006.01)
(52) U.S. Cl.
 CPC ....... *G06K 9/00751* (2013.01); *G06K 9/4671* (2013.01); *G06Q 30/0252* (2013.01)

(56) References Cited

U.S. PATENT DOCUMENTS

| | | |
|---|---|---|
| 2001/0013125 A1 | 8/2001 | Kitsukawa |
| 2002/0059590 A1 | 5/2002 | Kitsukawa et al. |
| 2010/0092093 A1 | 4/2010 | Akatsuka et al. |
| 2011/0035406 A1 | 2/2011 | Petrou et al. |
| 2011/0038512 A1 | 2/2011 | Petrou et al. |
| 2011/0125735 A1 | 5/2011 | Petrou |

FOREIGN PATENT DOCUMENTS

| | | | |
|---|---|---|---|
| JP | 2003-122757 A | 4/2003 | |
| JP | 2006-209657 A | 8/2006 | |
| JP | 2007-018166 A | 1/2007 | |
| JP | 2008-257649 A | 10/2008 | |
| JP | 2010-518507 A | 5/2010 | |
| JP | 2011-008507 A | 1/2011 | |
| JP | 2011-198130 A | 10/2011 | |
| JP | 2011-254460 A | 12/2011 | |
| WO | WO-2008/100248 A2 | 8/2008 | |
| WO | WO 2011/017557 * | 2/2011 | ............ G06F 17/30 |
| WO | WO-2011/017557 A1 | 2/2011 | |

OTHER PUBLICATIONS

David G. Lowe, "Distinctive Image Features from Scale-invariant Key Points," International Journal of Computer Vision, 2004, pp. 91 to 110.

Hironobus, Fujiyoshi, "Gradient-Based Feature Extraction-SIFT and HOG-", IEICE Technical Report, Aug. 27, 2007 (Aug. 27, 2007), vol. 107, No. 206, pp. 211 to 224.

Japanese Office Action issued in corresponding Japanese Patent Application No. 2013-549287, dated Nov. 24, 2016, 12 pages.

Yan Ke et al. "PCA-SIFT: A More Distinctive Representation for Local Image Descriptors", Proceedings of the 2004 IEEE Computer Society Conference on Computer Vision and Pattern Recognition (CVPR2004), vol. 2, pp. 506-513 (8 pages).

* cited by examiner

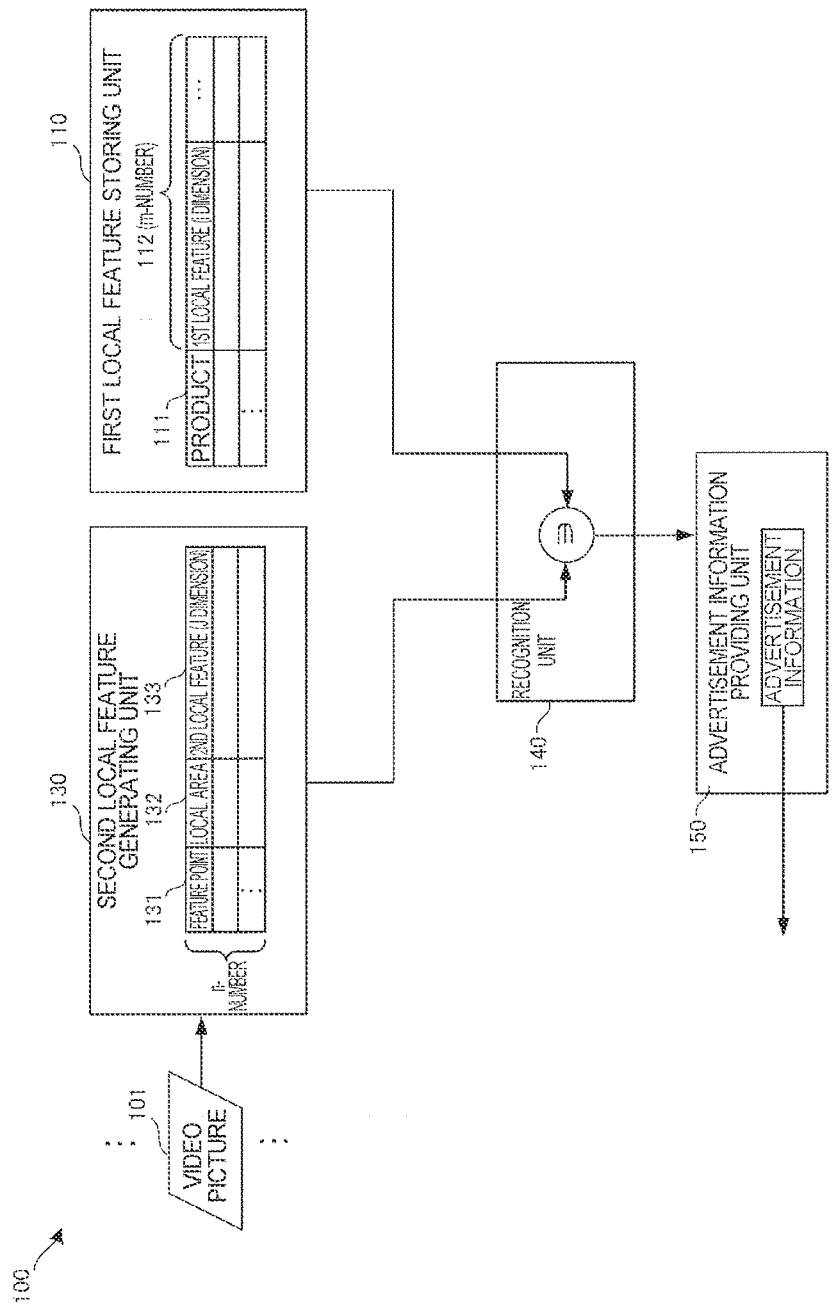

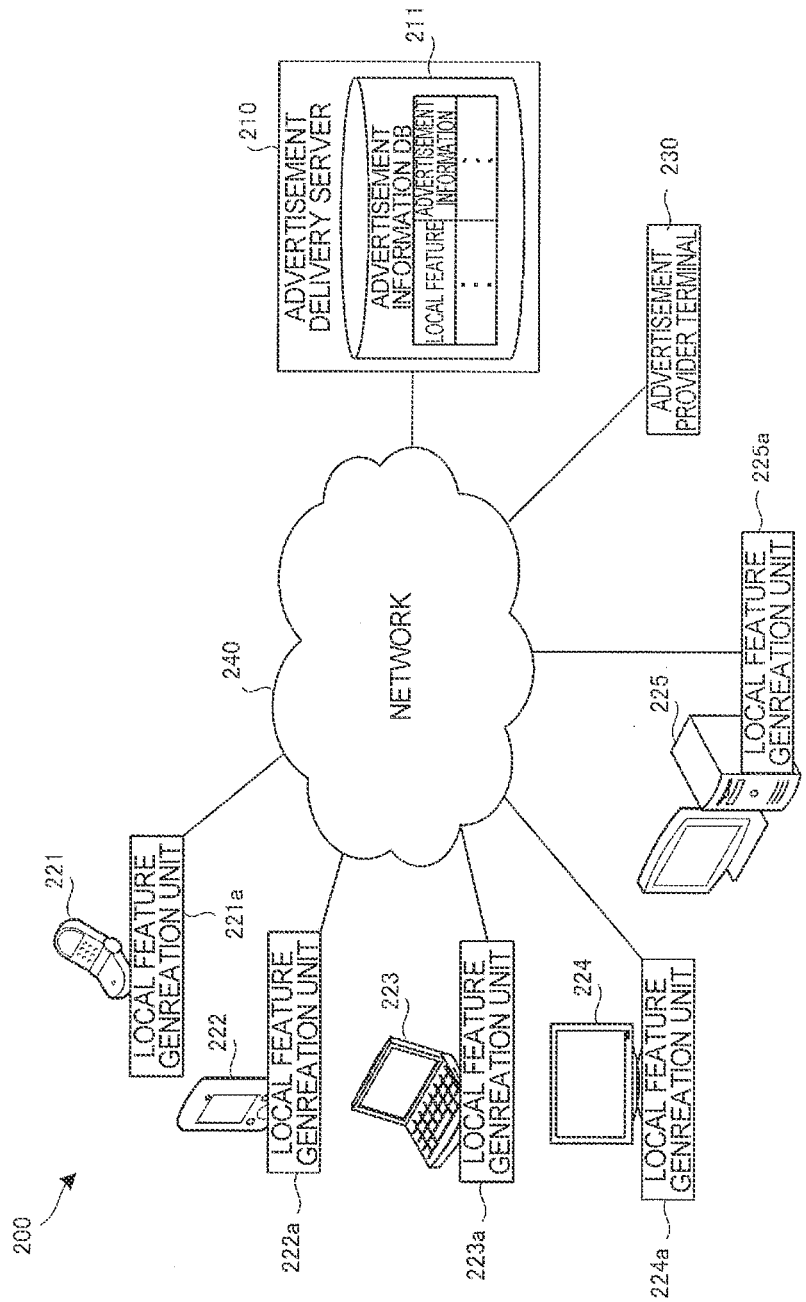

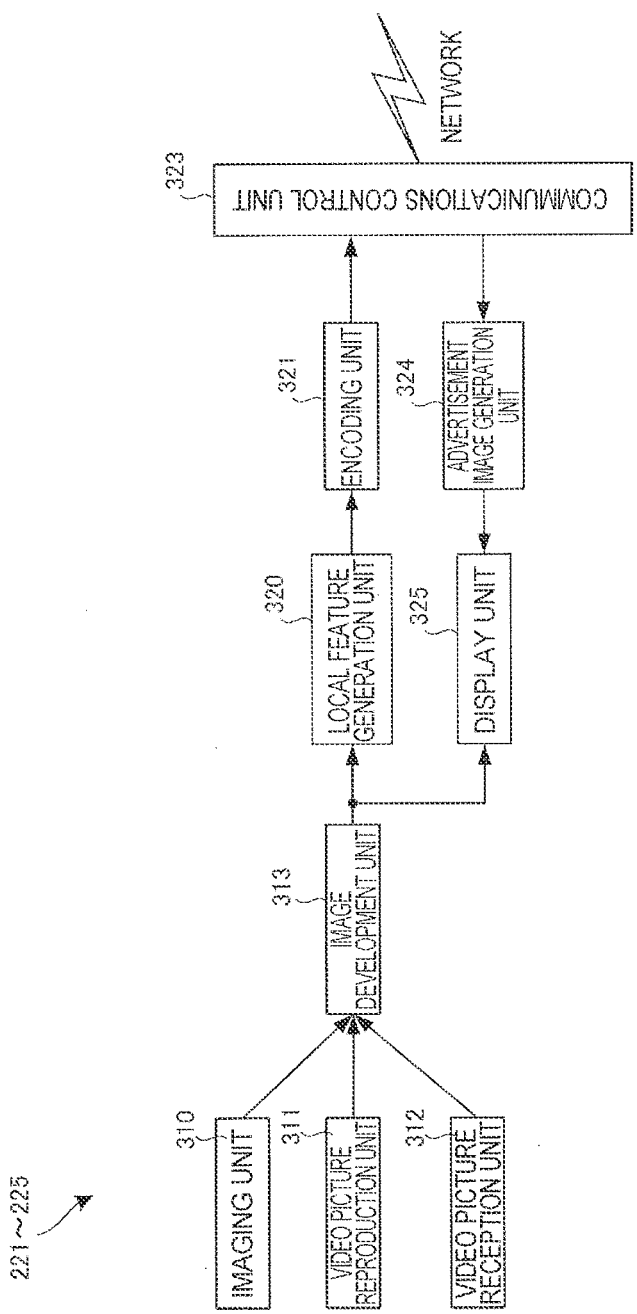

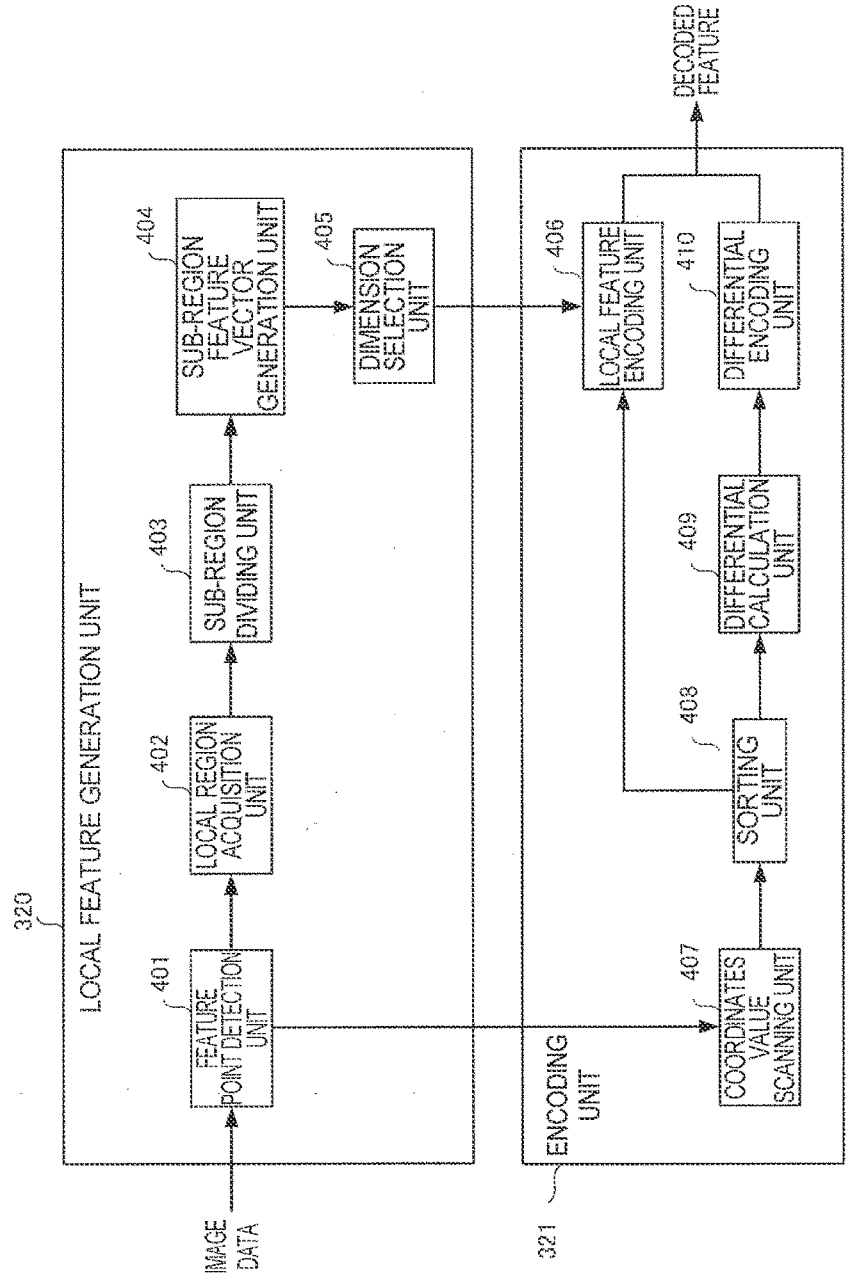

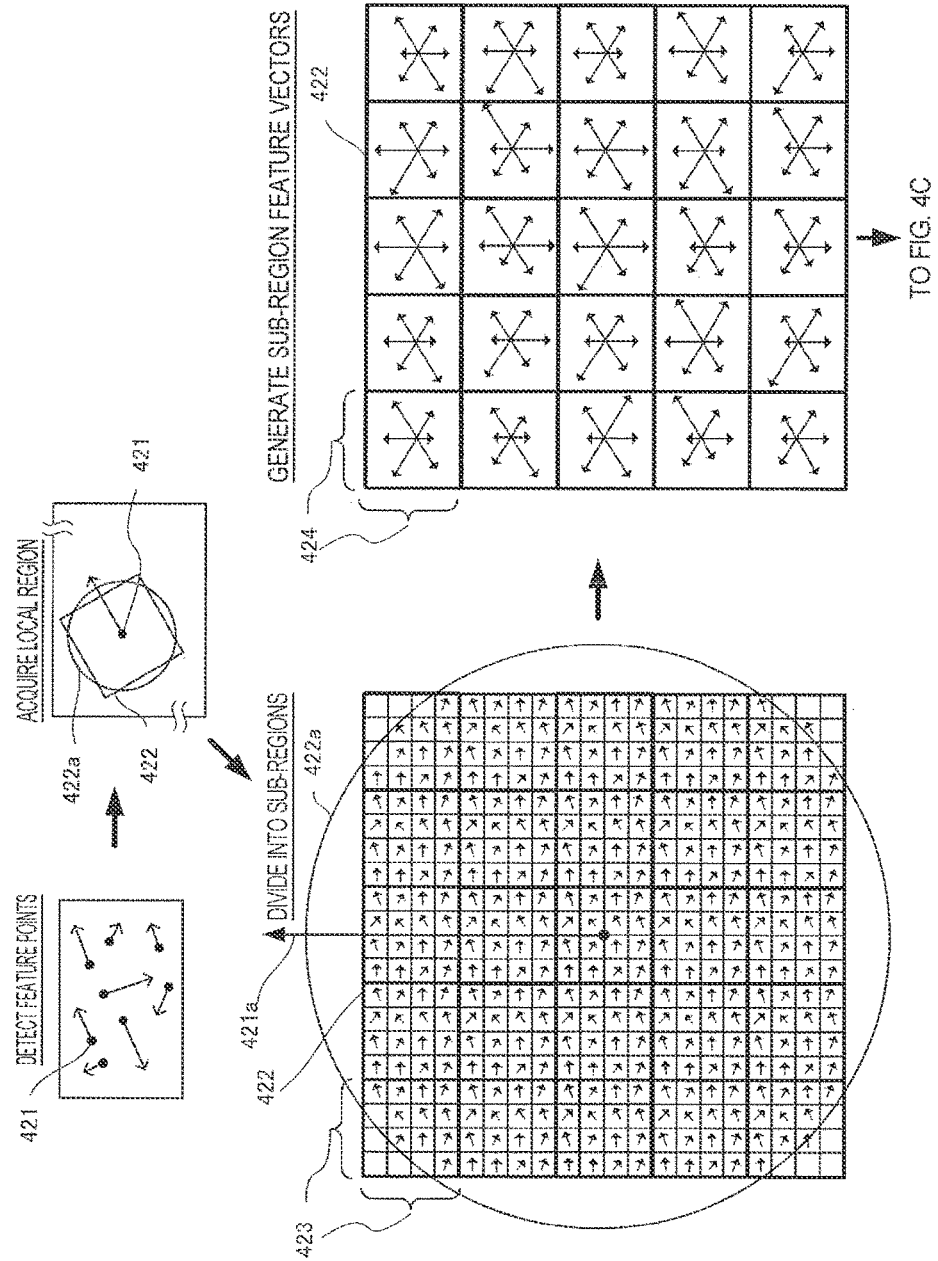

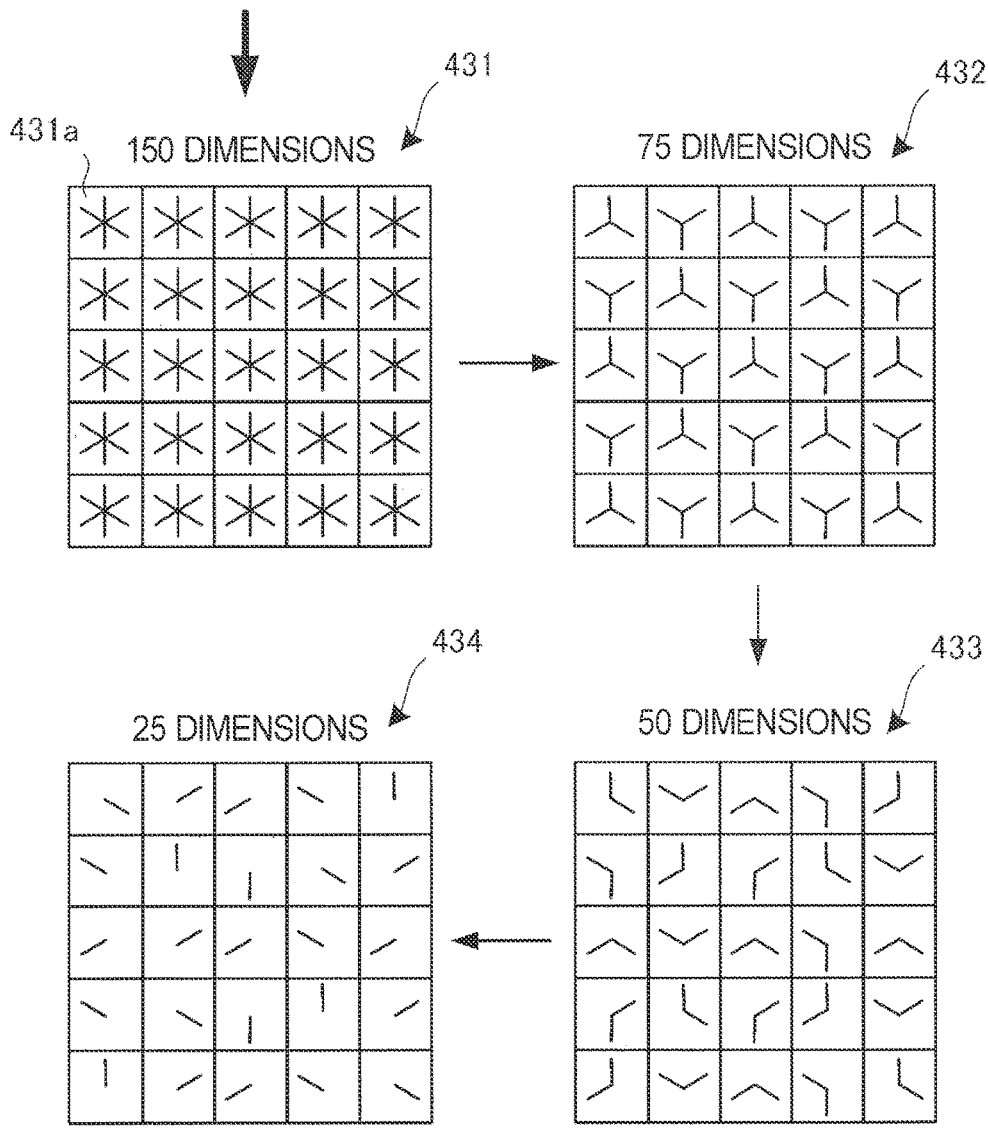

Fig. 4F

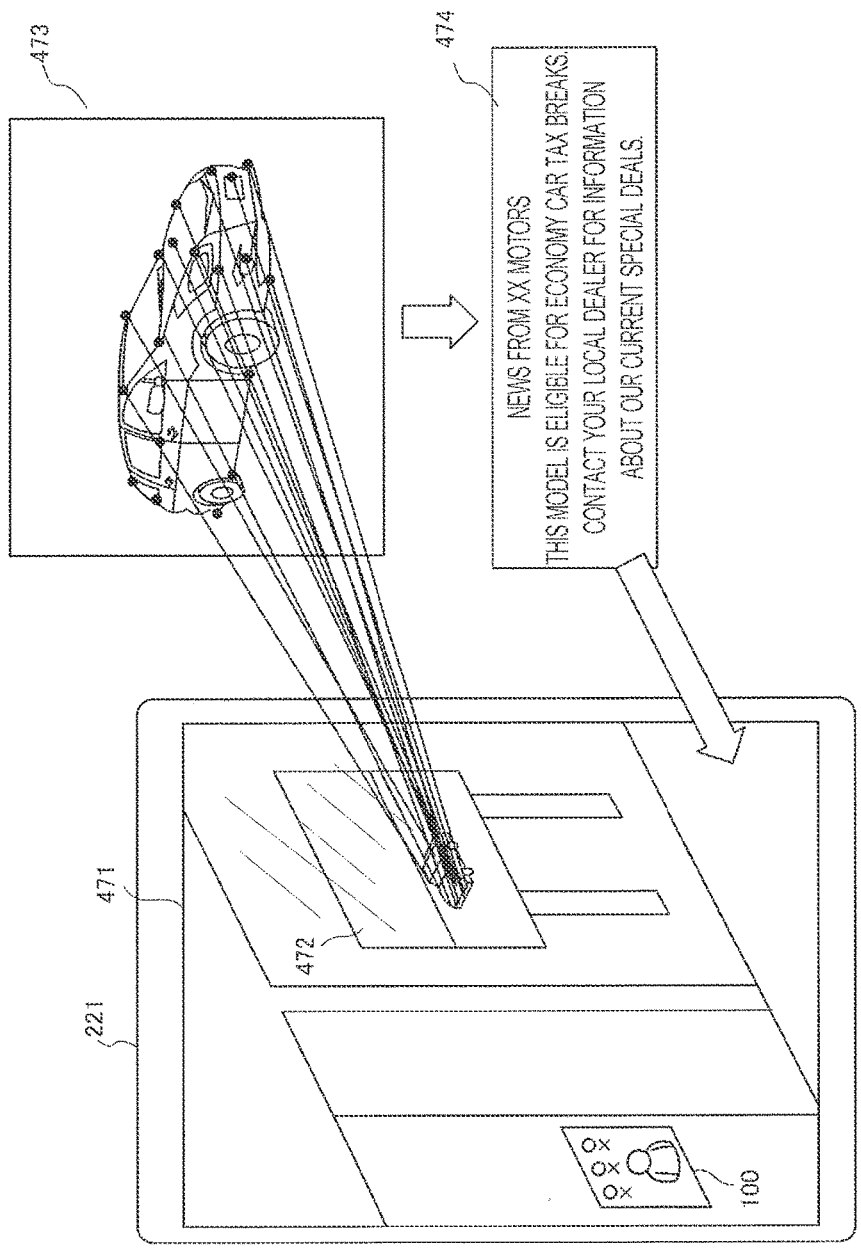

Fig. 6

| PRODUCT ID | PRODUCT NAME | LOCAL FEATURE | | | | ADVERTISEMENT INFORMATION | |
|---|---|---|---|---|---|---|---|
| | | ONE DIMENSION TO 25 DIMENSIONS | 26 DIMENSIONS TO 50 DIMENSIONS | ... | 126 DIMENSIONS TO 150 DIMENSIONS | DISPLAY DATA | SOUND DATA |
| 00001 | | | | | | | |
| 00002 | | | | | | | |
| ... | | | | | | | |

| INPUT IMAGE ID | DETECTED FEATURE POINT | FEATURE POINT COORDINATES | LOCAL REGION INFORMATION | SUB-REGION ID | SUB-REGION INFORMATION | FEATURE VECTOR | SELECTED DIMENSION (PRIORITY ORDER) | LOCAL FEATURE |
|---|---|---|---|---|---|---|---|---|
| | 001 | | | 001 | | | | |
| | 002 | | | 010 | | | | |
| | ... | ... | | ... | | | | |
| | | | | 001 | | | | |
| | | | | ... | | | | |

| PRODUCT ID | PRODUCT NAME | LOCAL FEATURE | | | | LINK INFORMATION | |
|---|---|---|---|---|---|---|---|
| | | ONE DIMENSION TO 25 DIMENSIONS | 26 DIMENSIONS TO 50 DIMENSIONS | ... | 126 DIMENSIONS TO 150 DIMENSIONS | DISPLAY DATA | LINK ADDRESS |
| 00001 | | | | | | | |
| 00002 | | | | | | | |
| ... | | | | | | | |

| TRANSMISSION HEADER | PRODUCT ID | PRODUCT NAME | DISPLAY POSITION | LINK INFORMAITON | ... |
|---|---|---|---|---|---|

| ADVERTISEMENT ID | OBJECT PRODUCT NAME | EXAMINATION TIME | NUMBER OF APPEARANCES | APPEARANCE FREQUENCY | ... | ADVERTISEMENT EVALUATION |
|---|---|---|---|---|---|---|
| ... | | | | | | |

2212

INFORMATION PROCESSING SYSTEM, INFORMATION PROCESSING METHOD, COMMUNICATIONS TERMINALS AND CONTROL METHOD AND CONTROL PROGRAM THEREOF

CROSS-REFERENCE TO RELATED APPLICATIONS

The present application is a national stage application of International Application No. PCT/JP2012/082230 entitled "Information Processing System, Information Processing Method, Communications Terminals and Control Method and Control Program Thereof," filed on Dec. 12, 2012, which claims the benefit of priority from Japanese Patent Application No. 2011-276524, filed on Dec. 16, 2011, the disclosures of which are incorporated herein in their entirety by reference thereto.

BACKGROUND

The present invention relates to technology for providing advertisement information corresponding to an imaging object.

In the abovementioned technical field, Patent Document 1 reveals technology for searching for and reporting, on the basis of features in a captured image of a product, the position of a shop which sells the product.

Patent Document 1: Patent Publication JP-A-2003-122757

SUMMARY

However, in the technology described in Patent Document 1 above, the divergence of feature points, the vertical/horizontal aspect ratio of a product, and the density of a binarized image have been used as features quantities for search purposes, but with this method, the comparison accuracy has not been adequate and searching has taken time.

It is an object of the present invention to provide technology for resolving the problem described above.

In order to achieve the aforementioned object, the system relating to the present invention includes: a first local feature storage device which stores, in association with an object, m first local features which are respectively feature vectors from one dimension to i dimensions, generated in respect of m local regions containing each of m feature points in an image of the object;

a second local feature generation device which extracts n feature points from a video picture and generates n second local features which are respectively feature vectors from one dimension to j dimensions, in respect of n local regions respectively containing each of the n feature points;

a recognition device which selects a smaller number of dimensions, among the number of dimensions i of the feature vectors of the first local features and the number of dimensions j of the feature vectors of the second local features, and recognizes that the object is present in the video picture, when determination is made that at least a prescribed ratio of the m first local features which are feature vectors up to the selected number of dimensions corresponds to the n second local features which are feature vectors up to the selected number of dimensions; and an advertisement information providing device which provides advertisement information relating to the object recognized by the recognition device.

In order to achieve the aforementioned object, the method relating to the present invention includes:

a second local feature generation step of extracting n feature points from a video picture and generating n second local features which are respectively feature vectors from one dimension to j dimensions, in respect of n local regions containing each of the n feature points;

a reading step of reading out, from a first local feature storage device, m first local features each comprising feature vectors from one dimension to i dimensions, with the quantities being stored in the first local feature storage device and generated previously in respect of m local regions containing each of m feature points in an image of an object;

a recognition step of selecting a smaller number of dimensions, of the number of dimensions i of the feature vectors of the first local features and the number of dimensions j of the feature vectors of the second local features, and recognizing that the object is present in the video picture, when determination is made that at least a prescribed ratio of the m first local features which are feature vectors up to the selected number of dimensions corresponds to the n second local features which are feature vectors up to the selected number of dimensions; and an advertisement information providing step of providing advertisement information relating to the object recognized in the recognition step.

In order to achieve the aforementioned object, the communications terminal relating to the present invention includes:

an imaging device which captures an image of an object;

a second local feature generation device which extracts m feature points from the image captured by the imaging device, and generates m second local features in respect of m local regions containing the respective m feature points;

a second local feature transmission device which sends the m second local features generated by the second local feature generation device to an information processing apparatus which recognizes an object contained in the image captured by the imaging device, on the basis of comparison of the local features; and an advertisement information providing device which receives advertisement information relating to the object contained in the image captured by the imaging device, and provides the advertisement information.

In order to achieve the aforementioned object, the method relating to the present invention includes:

an imaging step of capturing an image of an object;

a second local feature generation step of extracting m feature points from the image, and generating m second local features in respect of m local regions containing the respective m feature points;

a second local feature transmission step of sending the m second local features to an information processing apparatus which recognizes an object contained in the image on the basis of comparison of the local features; and an advertisement information providing step of receiving advertisement information relating to the object contained in the image, and providing the advertisement information.

In order to achieve the aforementioned object, the program relating to the present invention causes a computer to execute:

an imaging step of capturing an image of an object;

a second local feature generation step of extracting m feature points from the image, and generating m second local features in respect of m local regions containing the respective m feature points;

a second local feature transmission step of transmitting the m second local features to an information processing apparatus which recognizes an object contained in the image on the basis of comparison of the local features; and an advertisement information providing step of receiving advertisement information relating to the object contained in the image, and providing the advertisement information.

According to the present invention, advertisement information relating to an object can be provided in real time, while capturing images of the object.

DESCRIPTION OF DRAWINGS

FIG. 1 is a diagram showing a composition of an information processing system relating to a first embodiment of the present invention;

FIG. 2 is a diagram showing a general composition of an information processing system relating to a second embodiment of the present invention;

FIG. 3A is a diagram showing an internal functional composition of a communications terminal relating to the second embodiment of the present invention;

FIG. 4A is a diagram for illustrating a process for generating local features relating to the second embodiment of the present invention;

FIG. 4B is a diagram for illustrating a process for generating local features relating to the second embodiment of the present invention;

FIG. 4C is a diagram for illustrating a process for generating local features relating to the second embodiment of the present invention;

FIG. 4F is a diagram for illustrating a process for generating local features relating to the second embodiment of the present invention;

FIG. 4G is a diagram for illustrating a comparison process relating to the second embodiment of the present invention;

FIG. 6 is a diagram showing a composition of an advertisement information database relating to the second embodiment of the present invention;

FIG. 9 is a diagram showing a process table of a communications terminal relating to the second embodiment of the present invention;

FIG. 18 is a diagram showing a composition of a link information database relating to the third embodiment of the present invention;

FIG. 19 is a diagram showing a composition of a link information transmission format relating to the third embodiment of the present invention;

FIG. 22 is a diagram for illustrating an information processing system relating to a sixth embodiment of the present invention.

DETAILED DESCRIPTION

Figure 3B:
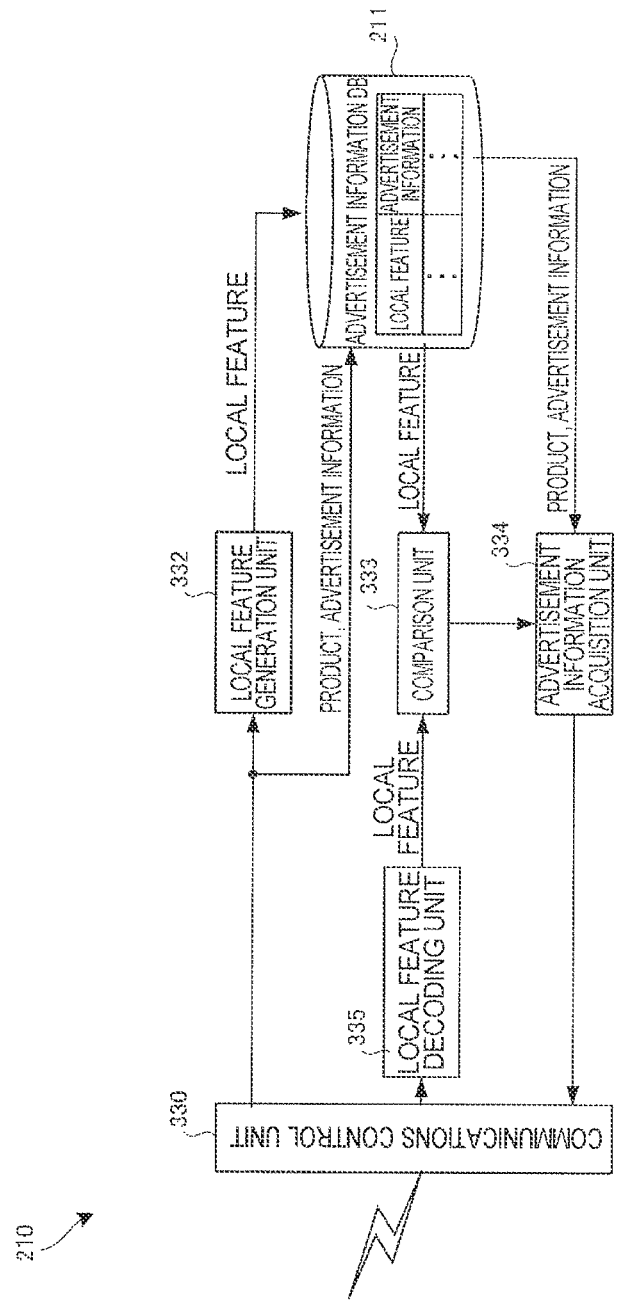
FIG. 3B is a diagram showing an internal functional composition of an advertisement delivery server relating to the second embodiment of the present invention.

Below, embodiments of the present invention are described in detail with reference to the accompanying drawings. However, the constituent elements indicated in the following embodiments are merely illustrative examples and the technical scope of the present invention is not limited to these examples.

First Embodiment

The information processing system 100 which is a first embodiment of the present invention will now be described with reference to FIG. 1. The information processing system 100 is a system for recognizing, in real time, an object during image capture, and providing advertisement information.

As shown in FIG. 1, the information processing system 100 includes a first local feature storage unit 110, a second local feature generation unit 130, a recognition unit 140 and an advertisement information providing unit 150.

The first local feature storage unit 110 stores, in association with the object, m first local features respectively comprising feature vectors from one dimension to i dimensions, which are generated in respect of m local regions containing each of m feature points in an image of an object.

The second local feature generation unit 130 extracts n feature points from a newly acquired video picture 101, and generates n second local features each comprising feature vectors from one dimension to j dimensions, in respect of n local regions including n features points.

The recognition unit 140 selects a smaller number of dimensions, of the number of dimensions i of the feature vectors of the first local features and the number of dimensions j of the feature vectors of the second local features. The recognition unit 140 recognizes that an object is present in the video picture, if it is determined that at least a prescribed ratio of the m first local features comprising feature vectors up to the selected number of dimensions corresponds to the n second local features comprising feature vectors up to the selected number of dimensions.

The advertisement information providing unit 150 provides advertisement information relating to the object recognized by the recognition unit 140.

According to the present embodiment, it is possible to provide advertisement information, in real time, in respect of a recognized object in a video picture, while maintaining recognition accuracy.

Second Embodiment

Next, an information processing system 200 relating to a second embodiment of the present invention will be described with reference to FIG. 2 to FIG. 15. FIG. 2 is a diagram for describing the general composition of the information processing system 200 relating to the present embodiment.

<<General Composition>>

The information processing system 200 includes an advertisement delivery server 210 having an advertisement information database (advertisement delivery DB) 211, communications terminals 221 to 225 provided with local feature generation units 221a to 225a, and an advertisement provider terminal 230, which are connected to one another via communication line of a network 240. The communications terminals 221 to 225 use the local feature generation units 221a to 225a to generate local features from a video image during image capture, for example, and send these local features to the advertisement delivery server 210.

The advertisement delivery server 210 compares the sent local features with local features stored previously in the advertisement information database 211. If this comparison is successful, then the advertisement delivery server 210 judges that the object in a video picture is an object for advertisement delivery, reads out advertisement information stored in association therewith, and sends this information to the communications terminals 221 to 225. In the communications terminals 221 to 225, the received advertisement information is displayed on a screen.

Furthermore, the advertisement provider terminal 230 provides a product image and advertisement information to the advertisement delivery server 210, either directly or via the network 240. The advertisement delivery server 210 analyzes the provided image of a product, generates local features, associates these with advertisement information, and stores same in the advertisement information database 211.

FIG. 3A is a block diagram showing the internal functional composition of communications terminals 221 to 225. The communications terminals 221 to 225 have an imaging unit 310, such as a camera, a video picture reproduction unit 311 for reading out and reproducing internally stored video picture data, and a video picture reception unit 312 which receives a so-called one-seg or terrestrial digital video picture, via an antenna (not illustrated). The video picture acquired by the imaging unit 310, the video picture reproduction unit 311 and the video picture reception unit 312 is developed in the image development unit 313, and is then displayed on the display unit 325. In this case, the image development unit 313 outputs the developed image to a local feature generation unit 320, simultaneously with outputting same to the display unit 325. The local feature generation unit 320 extracts n feature points from the developed image, and generates n local features each comprising feature vectors from one dimension to j dimensions, in respect of the n local regions containing the respective n feature points, and sends these local features to an encoding unit 321. The encoding unit 321 encodes the local features and transfers same to the communications control unit 360. The communications control unit 360 transfers the encoded local features to the advertisement delivery server 210. The communications control unit 360 also receives advertisement information from the advertisement delivery server 210 and transfers same to an advertisement image generation unit 324. The advertisement image generation unit 324 generates an advertisement image from the received advertisement information and transfers same to the display unit 325. The display unit 325 either superimposes or adds an advertisement image generated by the advertisement image generation unit 324, to the video picture being captured or the video picture being reproduced, and displays same. In other words, the advertisement image generation unit 324 functions as an advertisement information adding device.

FIG. 3B is a block diagram showing the internal functional composition of an advertisement delivery server 210. The advertisement delivery server 210 includes, in addition to the advertisement information database 211, a communications control unit 330, a local feature generation unit 332, a comparison unit 333, an advertisement information acquisition unit 334 and a local feature decoding unit 335. The communications control unit 330 receives a product image, detailed information on the product and advertisement information that is to be displayed in relation to the product, from the advertisement provider terminal 230. The received product image is sent to the local feature generation unit 332 and is subjected to local feature generation processing. The generated local features are associated with the product information and advertisement information, and are stored in the advertisement information database 211.

On the other hand, upon receiving the encoded local features from the communications terminals 221 to 225 via the network, the communications control unit 330 transfers same to the local feature decoding unit 335. The local feature decoding unit 335 decodes the local features and transfers same to the comparison unit 333. The comparison unit 333 compares the local features received via the network with local features stored previously in the advertisement information database 211. The local features stored here are m local features each comprising feature vectors from one dimension to i dimensions, generated respectively for m local regions containing each of m feature points in an image of an object.

The comparison unit 333 selects the smaller number of dimensions, of the two numbers of dimensions i and j of the feature vectors of the local features acquired from the local feature decoding unit 335 and the advertisement information database 211. The comparison unit 333 compares the n local features comprising feature vectors up to the selected number of dimensions, which are the local features that have been acquired from the local feature decoding unit 335, with the m local features comprising feature vectors up to the selected number of dimensions, which have been acquired from the advertisement information database 211. If the comparison unit 333 judges that at least a prescribed ratio of these local features are corresponding, then the comparison unit 333 recognizes that there is an advertisement object in the video picture and transfers this recognition result to the advertisement information acquisition unit 334. The advertisement information acquisition unit 334 reads out advertisement information corresponding to the advertisement object, from the advertisement information database 211, on the basis of the comparison result indicating that an advertisement object is present in the video picture, and sends this advertisement information to communications terminals 221 to 225 via the communications control unit 330.

<<Compositions of Local Feature Generation Unit and Encoding Unit>>

FIG. 4A is a block diagram showing compositions of a local feature generation unit 320 and an encoding unit 321.

The local feature generation unit 320 includes a feature point detection unit 401, a local region acquisition unit 402, a sub-region dividing unit 403, a sub-region feature vector generation unit 404 and a dimension selection unit 405.

The feature point detection unit 401 detects a plurality of feature points from the image data, and outputs the coordinates position, scale (size) and angle of each of the feature points.

The local region acquisition unit 402 acquires local regions for extracting features, from the coordinates values, scale and angle of the detected features points.

The sub-region dividing unit 403 divides the local regions into sub-regions. For example, the sub-region dividing unit 403 can divide a local region into 16 blocks (4×4 blocks) or into 25 blocks (5×5 blocks). The number of divisions is not limited. Below, a case where the local region is divided into 25 blocks (5×5 blocks) is described as a typical example.

The sub-region feature vector generation unit 404 generates feature vectors for each of the sub-regions of the local region. The sub-region feature vector generation unit 404 can generate feature vectors of a plurality of dimensions by using a gradient direction histogram, for example, as feature vectors of the sub-regions.

The dimension selection unit 405 selects the dimensions to output as the local features (for example, by thinning), on the basis of the positional relationship of the sub-regions, in such a manner that there is a low correlation between the feature vectors of proximate sub-regions. Furthermore, the dimension selection unit 405 can decide the selection priority order, rather than just selecting the dimensions. In other words, the dimension selection unit 405 is able to select the dimensions by applying a priority order, in such a manner that dimensions in the same gradient direction are not selected in adjacent sub-regions, for example. The dimension selection unit 405 outputs feature vectors constituted by the selected dimensions, as local features. The dimension selection unit 405 can output local features with the dimensions in a rearranged order on the basis of the priority order.

The encoding unit 321 has a coordinates value scanning unit 407 which inputs the coordinates of the feature points, from the feature point detection unit 401 of the local feature generation unit 320, and scans the coordinates values. The coordinates value scanning unit 407 scans the image in accordance with a certain particular scanning method, and converts the two-dimensional coordinates values (X coordinates value and Y coordinates value) of the features points to one-dimensional index values. This index value is the scanning distance from the point of origin, according to the scanning action. There are no particular restrictions on the scanning method.

Furthermore, the encoding unit 321 has a sorting unit 408 which sorts the index values of the feature points and outputs information about the sequence after sorting. Here, the sorting unit 408 sorts the index values in ascending order, for example. The index value may also be sorted in descending order.

Moreover, the encoding unit 321 has a differential calculation unit 409 which calculates a differential between two adjacent index values, of the sorted index values, and outputs a series of differential values.

The encoding unit 321 also has a differential encoding unit 410 which encodes the series of differential values, according to the order of the series. The encoding of the series of differential values may be fixed bit length encoding, for instance. If encoding with a fixed bit length, it is possible for the bit length to be designated in advance, but since it is necessary to have the number of bits required expressing the maximum differential value that can be envisaged, then the encoded size does not become smaller. Therefore, if the differential encoding unit 410 encodes the differential values with a fixed bit length, the bit length can be decided on the basis of the input series of differential values. More specifically, for example, the differential encoding unit 410 can determine the maximum value of the differential values, from the input series of differential values, determine the number of bits required to express this maximum value (expression bit number), and encode the series of differential values using the determined expression bit number.

On the other hand, the encoding unit 321 has a local feature encoding unit 406 which encodes the local features of the corresponding feature points, in the same order as the index values of sorted feature points. By encoding the sorted index values in the same order, it is possible to associate the coordinates values encoded by the differential encoding unit 410, and the local features corresponding to same, in a one-to-one correspondence. The local feature encoding unit 406 is able to encode the local features of the selected dimensions, from the local features of 150 dimensions corresponding to one feature point, in a number of bytes corresponding to the number of dimensions, by using one byte for one dimension, for example.

<<Local Feature Generation Processing>>

Next, the processing of the local feature generation units 320, 332 relating to the present embodiment will be described in detail with reference to FIG. 4B to FIG. 4F.

Firstly, FIG. 4B is a diagram showing a series of processes involved in detecting feature points/acquiring local regions/dividing sub-regions/generating feature vectors, in the local feature generation unit 320. For information about this series of processes, reference should be made to U.S. Pat. No. 6,711,293; David G. Lowe, "Distinctive image features from scale-invariant key points", (U.S.A.), International Journal of Computer Vision, 60(2), 2004, p. 91 to 110.

(Detecting Feature Points)

Firstly, the feature point detection unit 401 detects feature points 421 from the image in the video picture, as shown in the top left of FIG. 4B. Below, the generation of local features is described by taking one feature point 421 as a representative example. Arrows are assigned to each of the feature points 421, each arrow incorporating, as factors, the direction and magnitude of change in the values of brightness, saturation, color hue, etc., in the surrounding pixels. Furthermore, the example in FIG. 4B shows a case where values are quantized in any of six directions separated by intervals of 60 degrees.

(Acquiring Local Regions)

Next, the local region acquisition unit 402 generates, for example, a Gaussian window 422a centered on the feature point 421 and generates a local region 422 which substantially includes this Gaussian window 422a, as shown in the top right of FIG. 4B. In the example in FIG. 4B, the local region acquisition unit 402 generates a square-shaped local region 422, but the local region may be a circular shape or another shape. The local region is acquired for each of the feature points. If the local region is circular, there is a beneficial effect in that the robustness is improved in respect of the imaging direction.

(Dividing Sub-Regions)

As shown in the bottom left of FIG. 4B, the sub-region dividing unit 403 divides the scale and angle of the pixels included in the local region 422 of the feature point 421 into sub-regions 423. In FIG. 4B, one sub-region is formed by 4×4=16 pixels, and the local region 422 is divided into a total of 5×5=25 sub-regions. However, the method of dividing the sub-regions and the number of divisions are not limited to these.

(Generating Sub-Region Feature Vectors)

As shown in the bottom right of FIG. 4B, the sub-region feature vector generation unit 404 quantizes the scale of the respective pixels in the sub-region, by generating a histogram in eight-direction angular units, to yield a feature vector 424 of the sub-region. More specifically, this indicates a direction normalized with respect to the angle output by the feature point detection unit 401. The sub-region feature vector generation unit 404 generates a histogram by totalizing the quantized six-direction frequencies, for each sub-region. In this case, the sub-region feature vector generation unit 404 outputs a feature vector constituted by a histogram having 150 dimensions (=25 sub-region blocks generated for each feature point×6 directions). Furthermore, the gradient direction is not limited to being quantized in six directions only, and may also be quantized in any desired number of directions, such as four, eight or ten directions. If the gradient direction is quantized in D directions, then taking the gradient direction before quantization to be G (0 to $2\pi$ radian), the quantized value Qq of the gradient direction (q=0, ..., D−1) can be determined by Expression (1) or Expression (2), for instance, but the invention is not limited to this.

$$Qq=\text{floor}(G \times D/2\pi) \quad (1)$$

$$Qq=\text{round}(G \times D/2\pi) \bmod D \quad (2)$$

Here, floor( ) is a function which discards fractions, round( ) is a function which rounds fractions to the nearest integer, and mod is calculation for determining a remainder. Furthermore, when the sub-region feature vector generation unit 404 generates a gradient histogram, rather than simply totalizing the frequencies, it is also possible to sum the magnitudes of the gradients. Furthermore, when the sub-region feature vector generation unit 404 totalizes the gradient histogram, then it is also possible to also add weighting values to the proximate sub-regions (adjacent blocks, etc.) in accordance with the distance between the sub-regions, rather than just the sub-regions to which the pixels belong. Moreover, the sub-region feature vector generation unit 404 may add the weighting values to the gradient directions before and after the quantized gradient directions. The feature vector of the sub-region is not limited to a gradient direction histogram, and may also include a plurality of dimensions (elements), such as color information, and the like. In the description of the present embodiment, a gradient direction histogram is used as a feature vector of the sub-region.

(Selecting Dimensions)

Next, the dimension selection process carried out by the dimension selection unit 405 will be described with reference to FIG. 4C to FIG. 4F.

The dimension selection unit 405 selects (culls) the dimensions (elements) to output as the local features, on the basis of the positional relationship of the sub-regions, in such a manner that there is a low correlation between the feature vectors of proximate sub-regions. More specifically, the dimension selection unit 405 selects the dimensions in such a manner that at least one gradient direction is different between adjacent sub-regions, for example. In the present embodiment, the dimension selection unit 405 mainly uses adjacent sub-regions as proximate sub-regions, but the proximate sub-regions are not limited to being adjacent sub-regions, and for example, it is possible to use sub-regions within a prescribed distance from the object sub-region, as proximate sub-regions.

FIG. 4C is a diagram showing one example of a case where a local region is divided into sub-regions of 5×5 blocks, and dimensions are selected from feature vectors 431 of a 150-dimension gradient histogram generated by quantizing the gradient direction in six directions. In the example in FIG. 4C, the dimensions are selected from feature vectors having 150 dimensions (5×5=25 sub-region blocks×6 directions).

As shown in FIG. 4C, the dimension selection unit 405 selects feature vectors 432 having a gradient histogram of 75 dimensions, namely, half of the dimensions, from the feature vectors 431 having a gradient histogram of 150 dimensions. In this case, in the adjacent sub-region blocks on the left/right and upper/lower sides, the dimensions can be selected so as to avoid choosing dimensions in the same gradient direction.

In this example, if the quantized gradient direction in the gradient direction histogram is taken to be q (q=0, 1, 2, 3, 4, 5), then blocks in which the elements q=0, 2, 4 are selected, and sub-region blocks in which the elements q=1, 3, 5 are selected, are arranged in alternating fashion. In the example in FIG. 4C, if the gradient directions selected in adjacent sub-region blocks are matching, then all six directions are included.

Furthermore, the dimension selection unit 405 selects feature vectors 433 of a 50-dimension gradient histogram, from the feature vectors 432 of a 75-dimension gradient histogram. In this case, it is possible to select dimensions in such a manner that only one direction is the same (and the other direction is different), between sub-region blocks which are positioned diagonally at 45°.

Furthermore, if the dimension selection unit 405 selects feature vectors 434 having a 25-dimension gradient histogram, from the feature vectors 433 having a 50-dimension gradient histogram, then it is possible to select dimensions in such a manner that the selected gradient directions are not matching between sub-region blocks positioned diagonally at 45°. In the example shown in FIG. 4C, the dimension selection unit 405 selects one gradient direction from each sub-region, from one dimension to 25 dimensions, selects two gradient directions from 26 dimensions to 50 dimensions, and selects three gradient directions from 51 dimensions to 75 dimensions.

In this way, it is desirable for all of the gradient directions to be selected in an even fashion, in such a manner that the gradient directions are not overlapping between adjacent sub-region blocks. Furthermore, at the same time, it is desirable for the dimensions to be selected in an even fashion from all of the local regions, as in the example shown in FIG. 4C. The dimension selection method shown in FIG. 4C is one example, and the selection method is not limited to this.

(Priority Order of Local Regions)

Figure 4D:
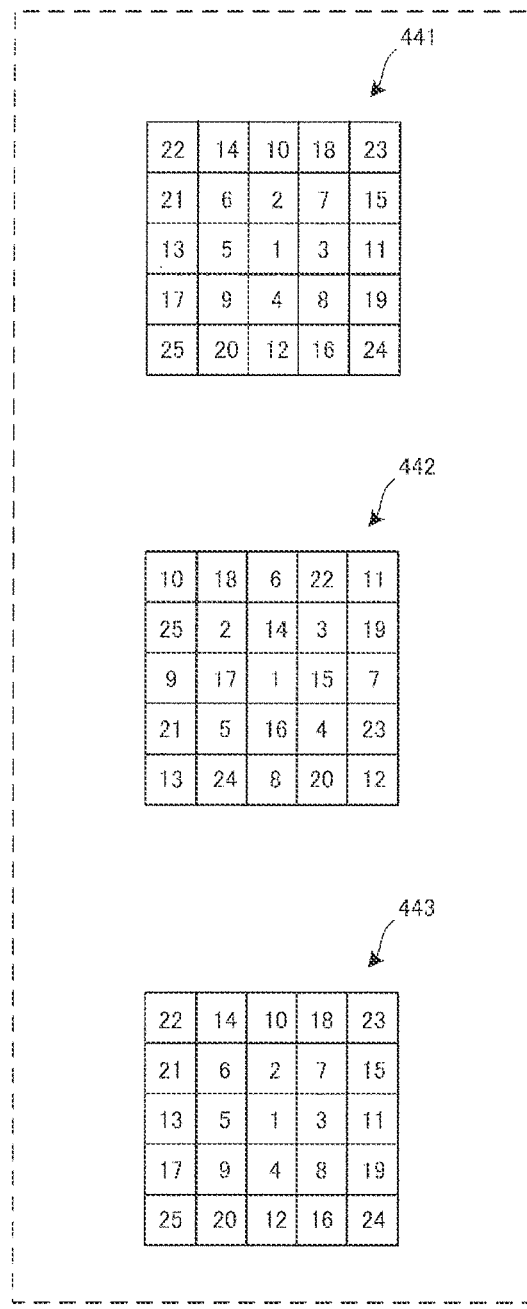
FIG. 4D is a diagram for illustrating a process for generating local features relating to the second embodiment of the present invention.

FIG. 4D is a diagram showing one example of the selection order of feature vectors from the sub-regions, in the local feature generation unit 320.

Rather than simply selecting the dimensions, the dimension selection unit 405 is also able to decide a selection priority order so that the dimensions are selected sequentially from the dimension which contributes most to the features of the feature point. In other words, the dimension selection unit 405 is able to select the dimensions by applying a priority order, in such a manner that dimensions in the same gradient direction are not selected in adjacent sub-region blocks, for example. The dimension selection unit 405 outputs feature vectors constituted by the selected dimensions, as local features. The dimension selection unit 405 can output local features with the dimensions in a rearranged order on the basis of the priority order.

More specifically, the dimension selection unit 405 may select the dimensions in such a manner that dimensions are added in the sequence of the sub-region blocks, as shown the matrix 441 in FIG. 4D, for example, between the 1 to 25 dimensions, 26 to 50 dimensions, and 51 to 75 dimensions. If the priority order shown in the matrix 441 in FIG. 4D is used, then the dimension selection unit 405 can successively select the gradient direction by raising the priority order of the sub-region blocks near to the center.

Figure 4E:
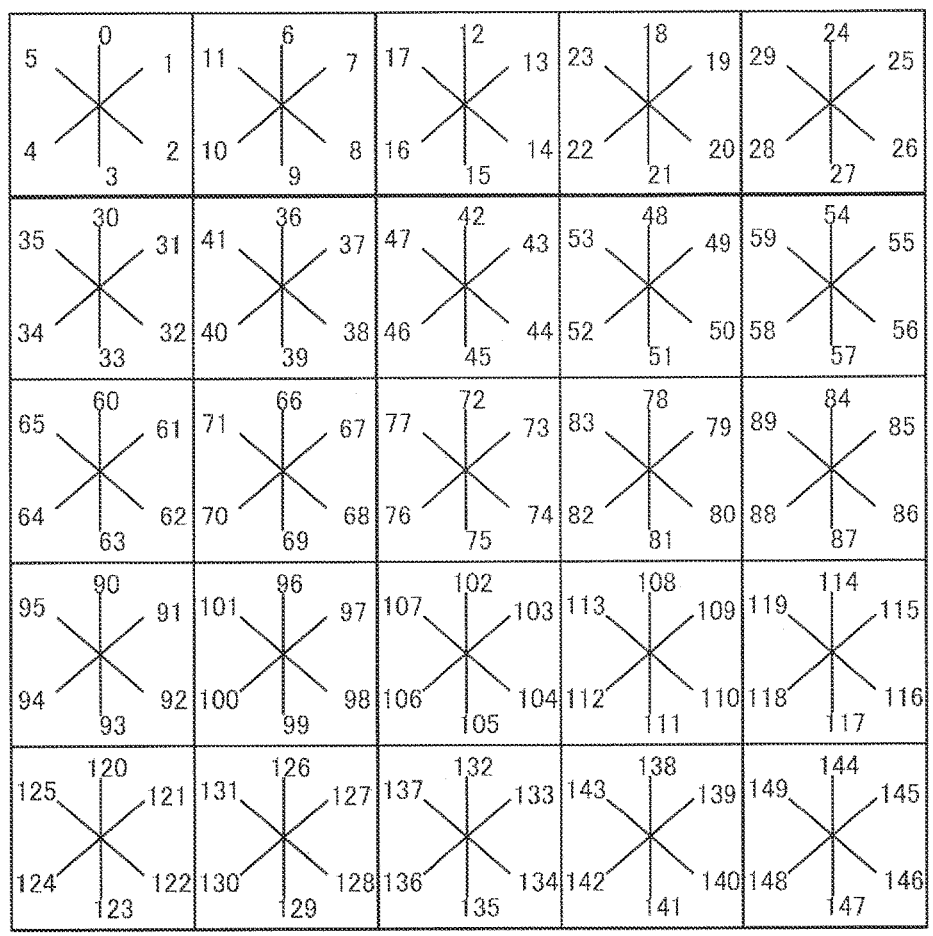
FIG. 4E is a diagram for illustrating a process for generating local features relating to the second embodiment of the present invention.

The matrix 451 in FIG. 4E is a diagram showing one example of the numbers of the elements of the feature vectors having 150 dimensions, in accordance with the selection order in FIG. 4D. In this example, if the 5×5=25 blocks are represented by the number p (p=0, 1, . . . , 25) in a raster scanning sequence, and the quantized gradient direction is taken to be q (q=0, 1, 2, 3, 4, 5), then the number of the elements in the feature vectors is 6×p+q.

Figure 4F:
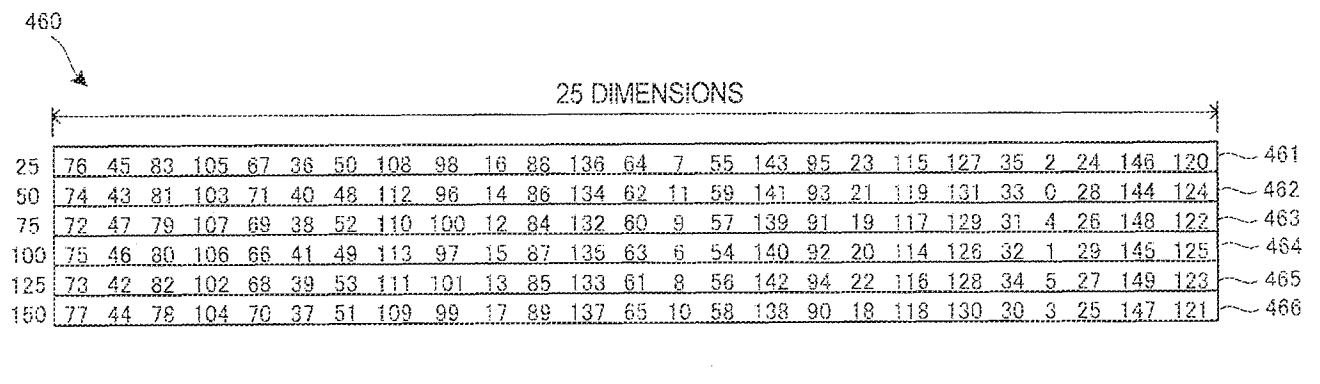

The matrix 460 in FIG. 4F is a diagram showing the fact that the order of the 150 dimensions according to the selection order in FIG. 4E has a hierarchy based on 25 dimension units. In other words, the matrix 460 in FIG. 4F is a diagram which shows a configurational example of local features obtained by progressively selecting the elements shown in FIG. 4E, in accordance with the priority order shown in the matrix 441 in FIG. 4D. The dimension selection unit 405 is able to output the dimension elements in the sequence shown in FIG. 4F. More specifically, when outputting 150-dimension local features, for instance, the dimension selection unit 405 is able to output elements of all 150 dimensions, in the sequence shown in FIG. 4F. Moreover, when outputting 25-dimension local features, for instance, the dimension selection unit 405 is able to output the elements 462 of the first row shown in FIG. 4F (the 76th, 45th, 83rd, . . . , 120th elements). Furthermore, when outputting 50-dimension local features, for instance, the dimension selection unit 405 is able to output the elements 463 of the second row shown in FIG. 4F, in the order shown in FIG. 4F (from left to right), in addition to the first row shown in FIG. 4F.

In the example shown in FIG. 4F, the local features have a hierarchical structure. In other words, for instance, in the 25-dimension local features and the 150-dimension local features, the arrangement of the elements 461 to 466 in the first 25-dimension local features is the same. In this way, by means of the dimension selection unit 405 selecting the dimensions hierarchically (progressively), it is possible to extract and output local features of a desired number of dimensions, in other words, local features of a desired size, in accordance with the application, the communications capacity, the terminal specifications, and so on. Furthermore, the dimension selection unit 405 selects the dimensions, hierarchically, and by outputting the dimensions in rearranged order on the basis of the priority order, it is possible to compare the image by using local features having different numbers of dimensions. For instance, if an image comparison is carried out by using 75-dimension local features and 50-dimension local features, then it is possible to calculate the distance between local features by using only the first 50 dimensions.

The features from the matrix 441 in FIG. 4D to the priority order shown in FIG. 4F are examples, and the procedure for selecting dimensions is not limited to this. For example, with regard to the number sequence of the blocks, apart from the example of the matrix 441 in FIG. 4D, it is also possible to use the number sequences shown in the matrix 442 in FIG. 4D or the matrix 443 in FIG. 4D. Furthermore, for example, the priority order may also be determined in such a manner that the dimensions are selected from each and every one of the sub-regions. Furthermore, it is also possible to determine the priority order in such a manner that the central area of the local region is given more importance and the selection frequency of the sub-regions in the central area is higher. Moreover, information indicating the dimension selection sequence may be designated by a program, for example, and may be stored in a table or the like (selection sequence storage unit) which is referred to when executing the program.

Furthermore, the dimension selection unit 405 may select the dimensions by selecting every other sub-region block. In other words, 6 dimensions are selected in one sub-region, and 0 dimensions are selected in other sub-regions proximate to that sub-region. In a case such as this, it can be considered that the dimensions are selected for each sub-region, in such a manner that the correlation between proximate sub-regions is lowered.

Furthermore, the shapes of the local regions and the sub-regions are not limited to a square shape, and may be set to any desired shape. For instance, the local region acquisition unit 402 may also acquire circular local regions. In this case, the sub-region dividing unit 403 can divide circular local regions, for example, into concentric 9-division or 17-division sub-regions. In this case also, the dimension selection unit 405 can select dimensions in each sub-region.

As shown in FIG. 4B to FIG. 4F above, according to the local feature generation unit 320 of the present embodiment, the dimensions of the feature vectors which are generated are selected hierarchically, while maintaining the amount of information in the local features. By this processing, it is possible to recognize an object and to display the recognition result in real time, while maintaining the recognition accuracy. The composition and processing of the local feature generation unit 320 is not limited to the present example. It is, of course, also possible to apply other processing that enables real-time object recognition and display of recognition results, while maintaining the recognition accuracy.

<<Comparison Unit>>

Figure 4H:
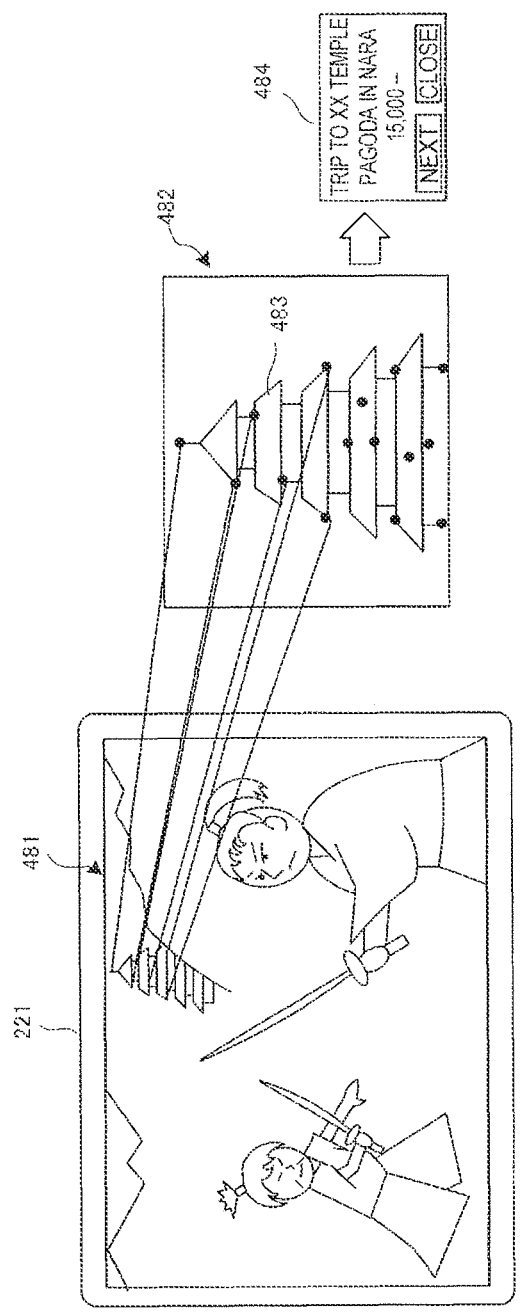
FIG. 4H is a diagram for illustrating a comparison process relating to the second embodiment of the present invention.

FIG. 4G and FIG. 4H are diagrams for describing processing by the comparison unit 333 relating to the present embodiment. FIG. 4G is a diagram illustrating a case where advertisement information is displayed during imaging, by a portable telephone or a smartphone, or the like, constituting the communications terminal 221. It is supposed that local features generated previously from an advertisement object (in the present example, an automobile), have been stored in an advertisement information database 211. On the other hand, local features are generated by the processing described above, from a video picture display region 472 on a live-view display screen 471. It is then determined whether or not the local features stored in the advertisement information database 211 are among the local features generated from the video picture display region 472.

As shown in FIG. 4G, the comparison unit 333 associates the features points in the video picture display region 472 having local features matching the local features 473 stored in the advertisement information database 211, as indicated by the fine lines. The comparison unit 333 determines that the feature points are matching when at least a prescribed ratio of the local features are matching. The comparison unit 333 recognizes that the object is an advertisement object, if the positional relationship between the sets of associated feature points is a linear relationship. If recognition of this kind is performed, then even if there is a difference in the size or orientation (viewpoint), or if the object is reversed, recognition is still possible. Furthermore, provided that there is at least a prescribed number of corresponding feature points, more accurate recognition is enabled, whereby it is possible to recognize a recognition object even if a portion thereof is concealed from view. As a result of the recognition, it is determined that the car of which an image is being captured (here, a photograph of a car displayed on an advertisement hoarding, but it may also be an actual car) is an advertisement object, the corresponding advertisement information 474 is retrieved, and an additional display or superimposed display is provided on the live-view display screen 471.

FIG. 4H is a diagram showing a comparison example of recognizing a building in a video picture. The local features 482 of a recognition object (in the present embodiment, a pag96oda 483) are previously registered in the advertisement information database 211. An image content such as a video picture is reproduced on a communications terminals 221, such as a smart device. In this case, the local feature generation unit 320 generates local features as described above, from the video picture display region 481. The comparison unit 333 of the advertisement delivery server 210 then determines whether or not the respective local features 482 stored in the advertisement information database 211 are among the local features generated from the video picture display region 481.

More specifically, as shown in FIG. 4H, the features points including local features which match at least a prescribed ratio of the local features stored in the advertisement information database 211 are associated, as indicated by the fine lines. Thereupon, if the positional relationship of the associated feature points is a linear relationship, then the recognition object is recognized. In the comparison processing of the comparison unit 333, comparison is carried out on the basis of the feature point coordinates and the local features, but recognition is also possible simply on the basis of a linear relationship of the arrangement sequence between the local features generated from the matching recognition object and the local features generated from the image in the video picture. On the other hand, in the present embodiment, a description based on a two-dimensional image is given, but similar processing is also possible if using three-dimensional feature point features.

<<Overall Processing Flow>>

Figure 5:
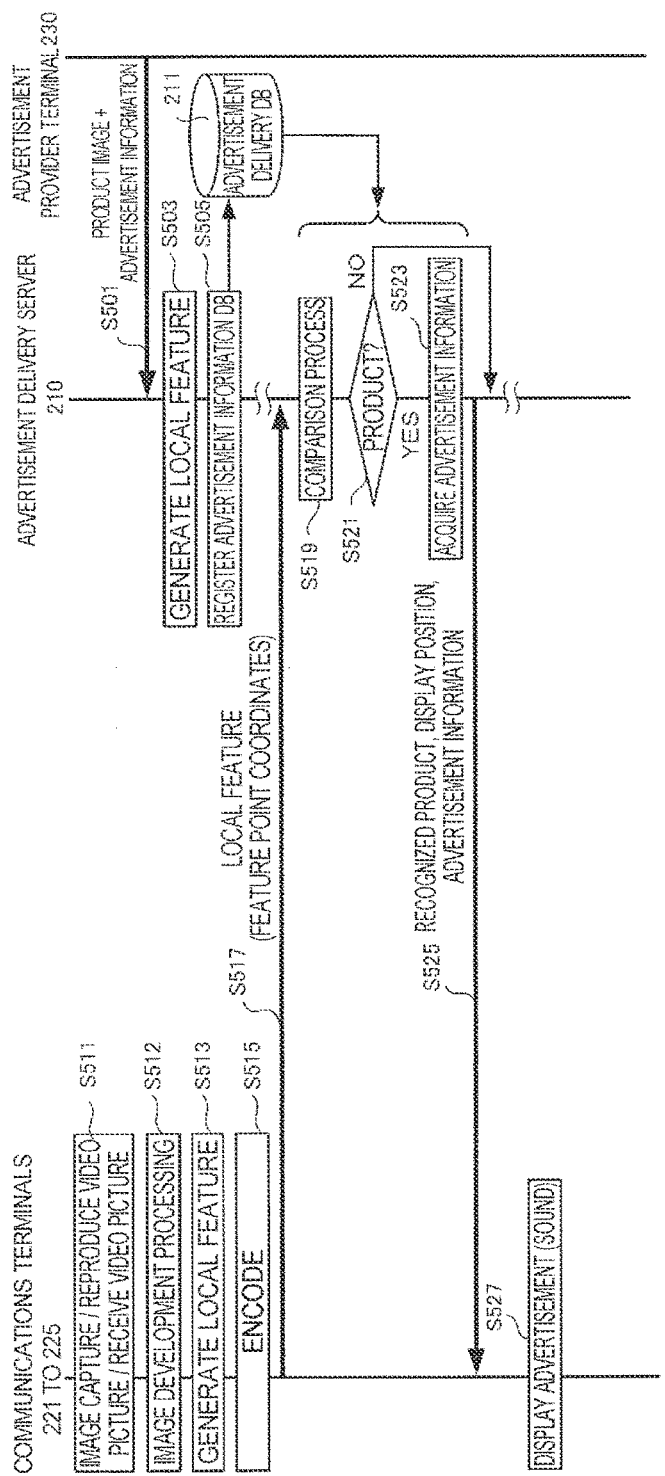
FIG. 5 is a sequence diagram showing general processing of an information processing system relating to the second embodiment of the present invention.

FIG. 5 is a sequence diagram illustrating a flow of processing in the information processing system 200. Firstly, the communications control unit 330 of the advertisement delivery server 210 receives a product image and advertisement information from the advertisement provider terminal 230 (S501), and the local feature generation unit 332 generates local features from this product image (S503). Next, the advertisement information database 211 stores the local features and the production information (S505).

On the other hand, in step S511, if image capture, video picture reproduction or video picture reception is performed, the procedure advances to step S512, and the image development unit 313 develops the image of one screen in the image memory. In step S513, the local feature generation unit 320 generates local features by the processing described above, from the developed image. In step S515, the local features generated by the encoding unit 321 are decoded, and in step S517, the communications control unit 330 sends the local features including the feature points coordinates, to the advertisement delivery server 210.

The advertisement delivery server 210 determines whether local features matching the received local features are stored in the advertisement information database 211 (S519, S521), and if such local features are stored therein, acquires the advertisement information corresponding to the local features (S523). The communications control unit 330 sends the acquired advertisement information to the communications terminals 221 to 225 (S525). In this case, the information about the recognized product and the advertisement display position may be sent simultaneously. This information may be stored in the advertisement information database 211.

The communications terminal 221 displays an advertisement at the prescribed position on the basis of the received advertisement information (S527). In this case, sound may also be output simultaneously.

FIG. 6 is a diagram showing a compositional example of an advertisement information database 211. As shown in FIG. 6, the advertisement information database 211 stores a production ID, a product name, local features generated from an image of the product, and advertisement information, in mutually associated fashion. Consequently, it is possible to derive the product information and advertisement information from the local features.

Figure 7:
FIG. 7 is a diagram showing a transmission format of advertisement information relating to the second embodiment of the present invention.

FIG. 7 is a diagram showing a communications format 701 used when the advertisement delivery server 210 delivers advertisement information to the communications terminals 221 to 225. As shown in FIG. 7, the transmission format of the advertisement information includes, apart from a transmission header, the product ID, the product name, the display position and advertisement information. In addition to this, the advertisement display timing and display continuation time, and the like, may also be sent to the communications terminals 221 to 225.

<<Hardware Composition and Respective Processes>>

Figure 8:
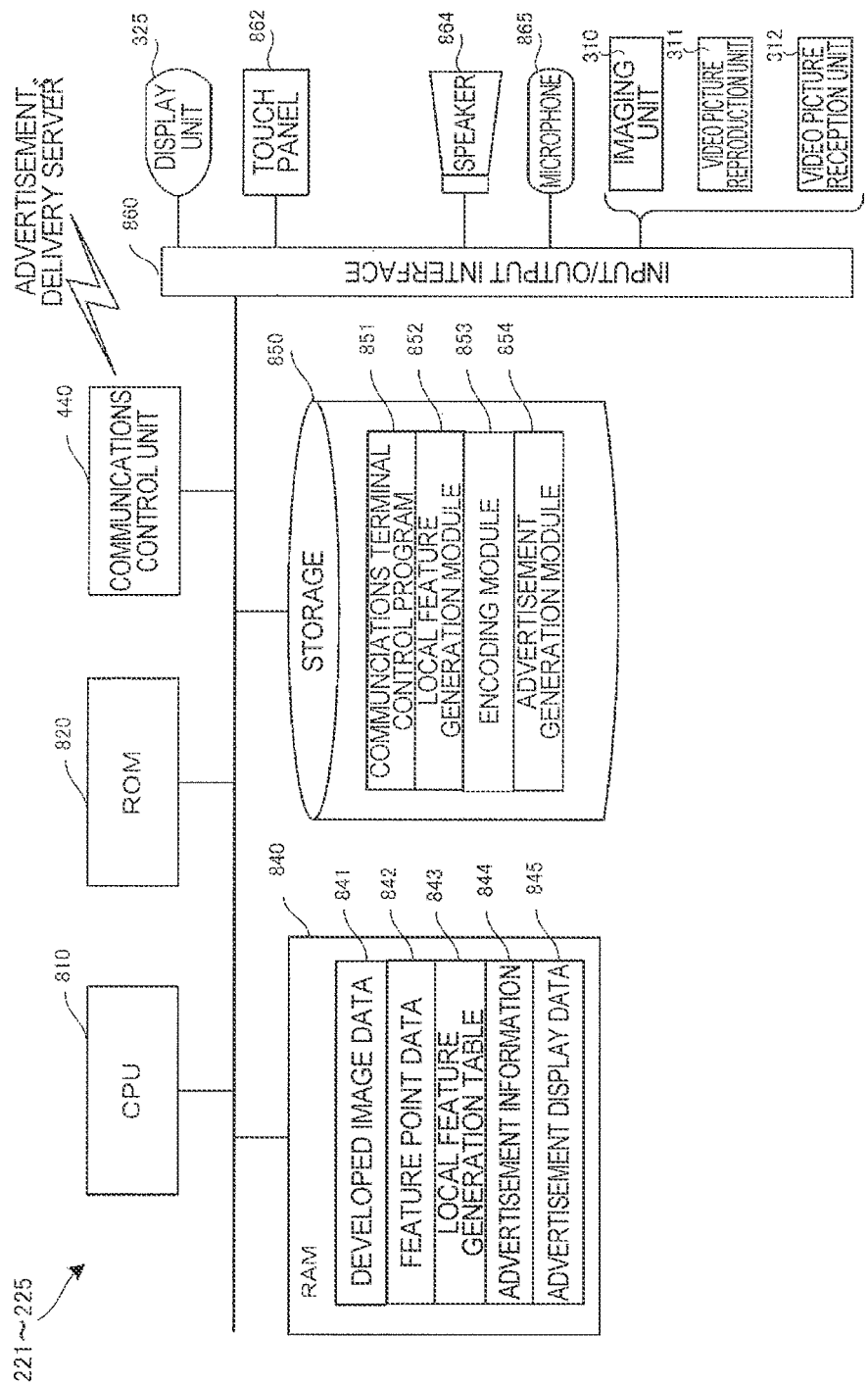
FIG. 8 is a diagram showing a hardware composition of a communications terminal relating to the second embodiment of the present invention.

FIG. 8 is a diagram showing the hardware composition of communications terminals 221 to 225. The CPU 810 is a calculation control processor, and achieves the respective functional constituent parts of the communications terminals by executing a program. The ROM 820 stores fixed data, such as initial data and programs. Furthermore, the communications control unit 330 is a communications control unit, and in the present embodiment, communicates with other apparatuses via a network. The CPU 810 is not limited to one CPU, and may include a plurality of CPUs or a GPU (Graphics Processing Unit) for image processing.

The RAM 840 is a random-access memory which is used by the CPU 810 as a work area for temporary storage. The RAM 840 guarantees an area for storing the data required for achieving the present embodiment. The developed image data 841 is data which is input after being captured by the imaging unit 310. The feature point data 842 is data including the feature point coordinates, scale and angle detected from the developed image data 841. The local feature generation table 843 is a table which stores data relating to the generation of local features. The advertisement information 844 is information which is derived by comparing the local features generated from the input video picture and the local features stored in the advertisement information database 211. The advertisement display data 845 is data for reporting the advertisement information 844 to a user. If a sound output is performed, then comparison result sound data may also be included.

The storage 850 stores a database and various parameters, or the following data or programs which are required to realize the present embodiment. The communications terminal control program 851 is a program for controlling all of the communications terminals. The local feature generation module 852 generates local features from the input video picture, in accordance with FIG. 4B to FIG. 4F. The encoding module 853 is a module which encodes the local features, and functions as an encoding unit 321 by being executed in the CPU 810. The advertisement generation module 854 is a module for generating advertisement images, and functions as an advertisement image generation unit 324 by being executed in the CPU 810.

The input/output interface 860 relays the input/output data to and from input/output devices. The input/output interface 860 is connected to the display unit 325, a touch panel 862, a speaker 864, a microphone 865 and an imaging unit 310. The input/output devices are not limited to the examples described above. Furthermore, the GPS (Global Position System) position generation unit 866 acquires the current position on the basis of a signal from a GPS satellite.

(Local Feature Generation Data)

FIG. 9 is a diagram showing a local feature generation table 843 relating to the present embodiment.

The local feature generation table 843 stores the plurality of detected feature points, feature point coordinates, and local region information corresponding to the feature points, in association with the input image ID. A plurality of sub-region IDs, sub-region information, feature vectors corresponding to the sub-regions and selected dimensions including the priority order, are stored in association with the detected feature points, feature point coordinates and local region information.

(Flow of Processing)

Figure 10:
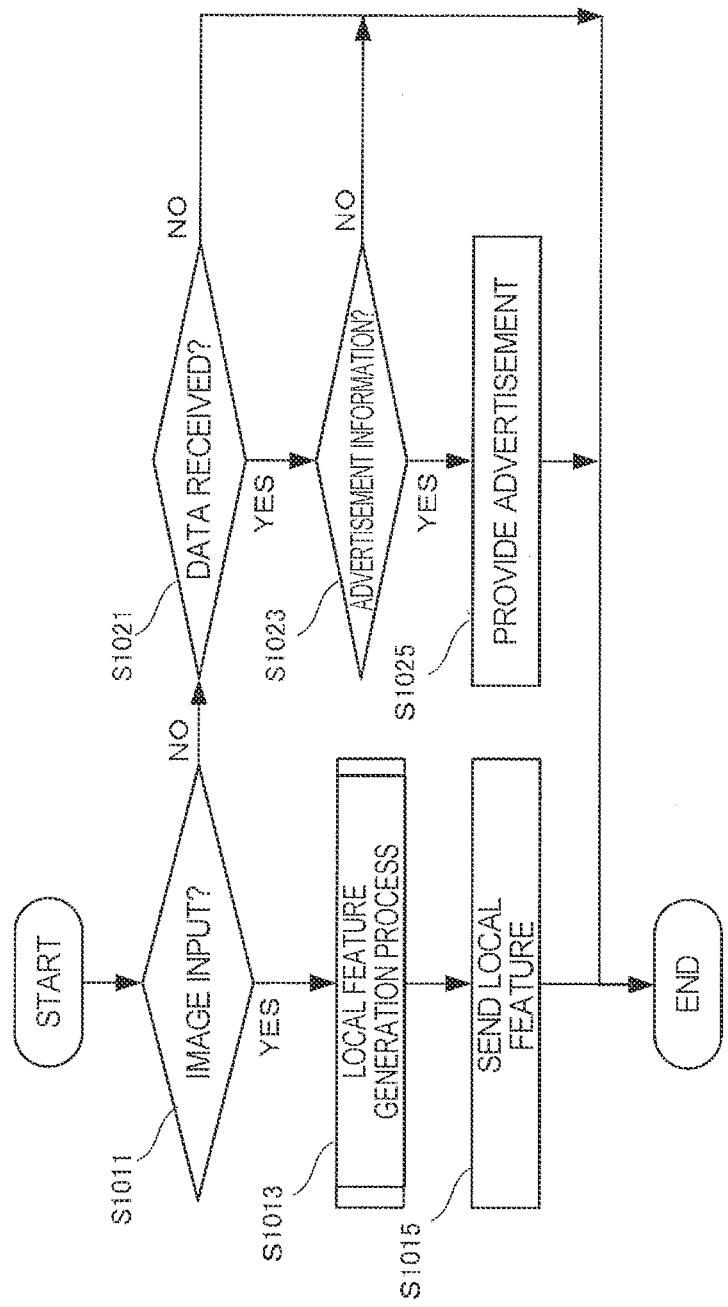
FIG. 10 is a flowchart showing a flow of processing by a communications terminal relating to the second embodiment of the present invention.

FIG. 10 is a flowchart illustrating the flow of processing which is carried out by the communications terminals 221 to 225. Firstly, when an image is input in step S1011, then in step S1013, the local feature generation unit 320 carries out local feature generation processing. Thereupon, in step S1015, the local features are sent to the advertisement delivery server 210. If it is determined in step S1021 that, rather than an image being input, external data has been received, then in step S1023, it is determined whether or not the data is advertisement information, and in the case of the advertisement information, an advertisement is provided at step S1025.

Figure 11:
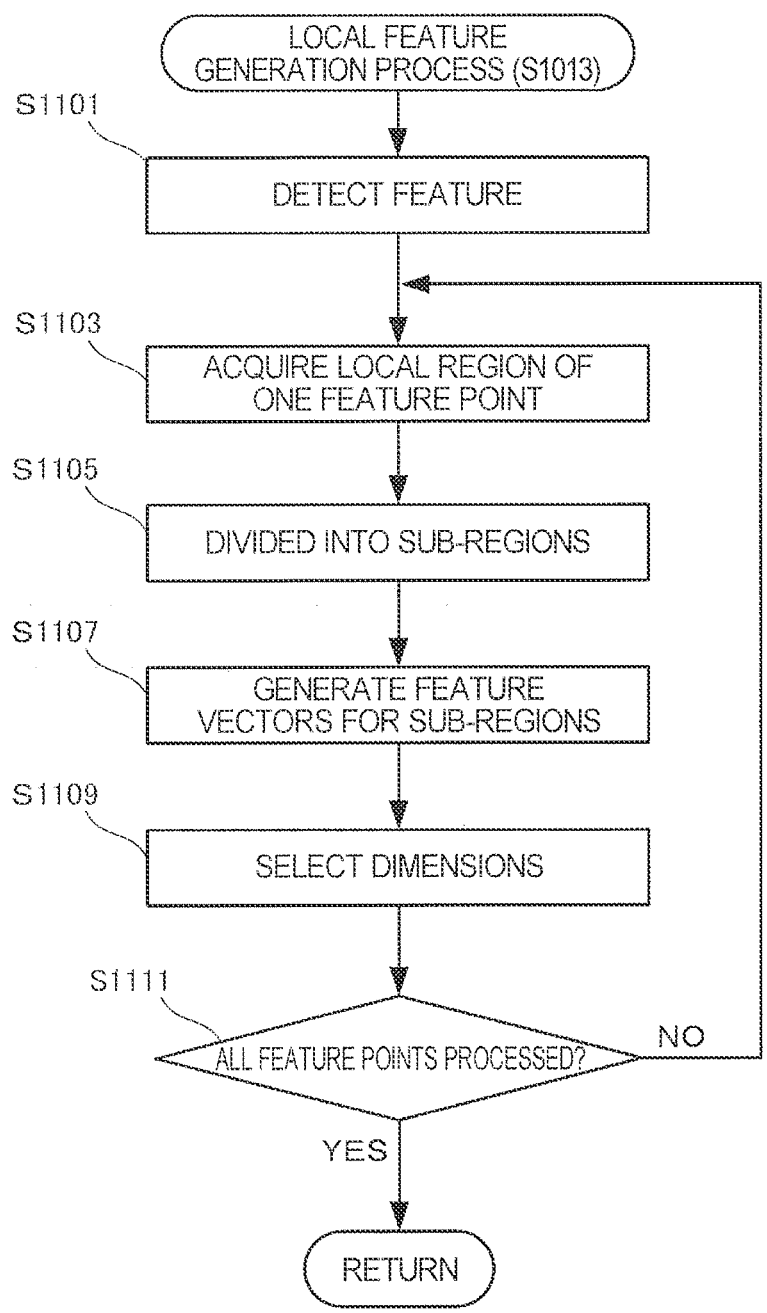
FIG. 11 is a flowchart showing a flow of processing by a communications terminal relating to the second embodiment of the present invention.

FIG. 11 is a flowchart for illustrating the flow of a local feature generation process which is carried out in step S1013 in FIG. 10. In step S1101, firstly, the feature point detection unit 401 detects the feature points. Thereupon, in step S1103, the local region acquisition unit 402 acquires a local region of one feature point. Moreover, in step S1105, the sub-region dividing unit 403 divides the local region into sub-regions. In step S1107, the sub-region feature vector generation unit 404 generates feature vectors of the sub-region. Furthermore, the dimension selection unit 405 selects the dimensions in step S1109. In step S1111, it is determined whether the dimension selection process has been completed in respect of all of the feature points, and if the process has not been completed, the procedure returns to step S1103.

Figure 12:
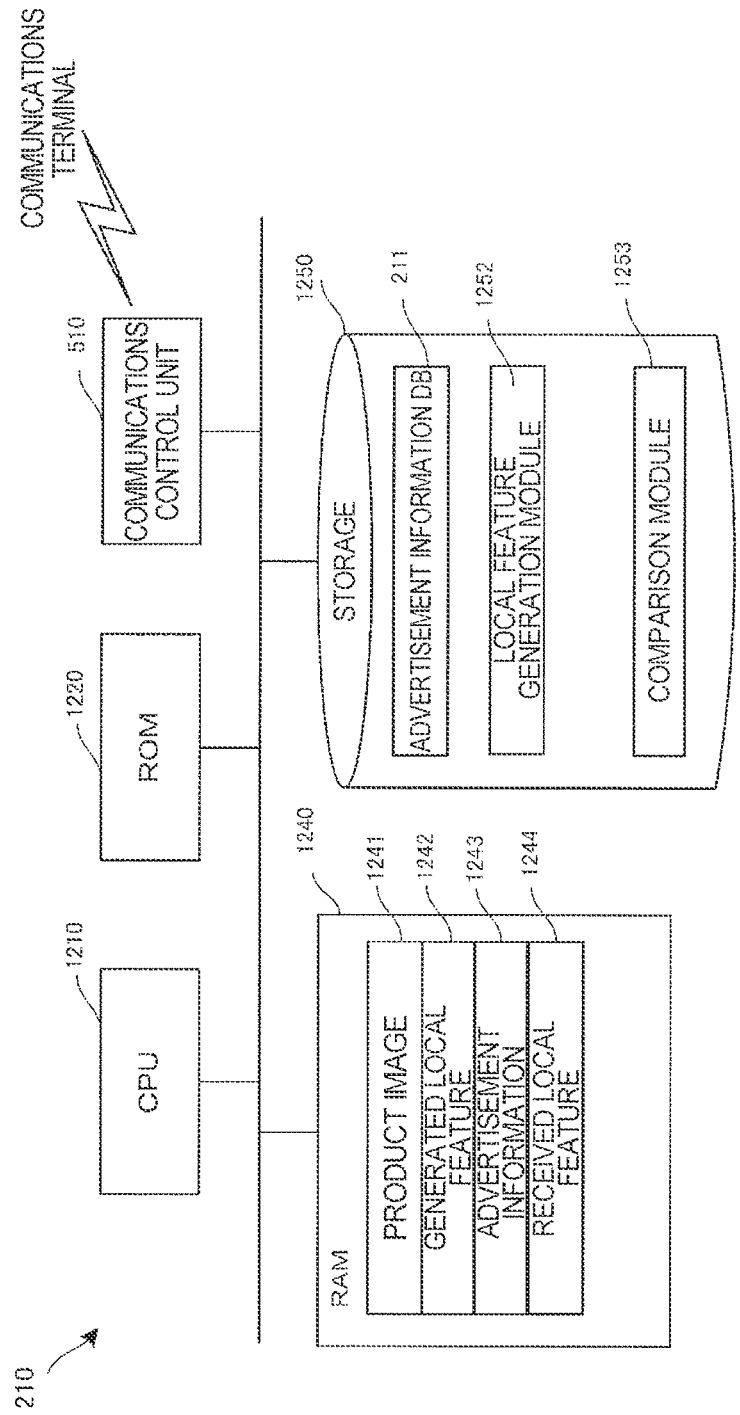
FIG. 12 is a diagram showing a hardware composition of an advertisement delivery server relating to the second embodiment of the present invention.

FIG. 12 is a diagram showing the hardware composition of the advertisement delivery server 210. Here, the CPU 1210 is a calculation control processor, which achieves the respective functional constituent parts of the advertisement delivery server 210 by executing a program. The ROM 1220 stores fixed data, such as initial data and programs. Furthermore, the communications control unit 510 is a unit for communicating with other apparatuses, via a network. The CPU 1210 is not limited to one CPU, and may include a plurality of CPUs or a GPU (Graphics Processing Unit) for image processing.

The RAM 1240 is a random-access memory which is used by the CPU 1210 as a work area for temporary storage. The RAM 1240 guarantees an area for storing the data required for achieving the present embodiment. On the other hand, the storage 1250 is a large-capacity storage medium which stores a database and various parameters, or the following data or programs which are required to realize the present embodiment.

The product image 1241 stored in the RAM 1240 is an image of a product received from the advertisement provider terminal 230. The local features 1242 is information generated by analyzing the product image 1241. Furthermore, the advertisement information 1243 is information relating to an advertisement for sending information relating to an advertisement received from the advertisement provider terminal 230, to the communications terminals 221 to 225.

The advertisement information database 211 of the storage 1250 stores the advertisement information 1243 and the local features 1242 in mutually associated fashion.

The storage 1250 stores a local feature generation module 1252 which carries out a local feature generation process. Due to the CPU 1210 executing a local feature generation module 1252, the local feature generation module 1252 functions as a local feature generation unit 332.

The storage 1250 stores a comparison module 1253 which carries out a local feature comparison process. Due to the CPU 1210 executing the comparison module 1253, the comparison module 1253 functions as a comparison unit 333.

The RAM 1240 also temporarily stores the local features 1244 received from the communications terminals 221 to 225 in order to use same in the comparison process in the comparison module 1253.

(Processing Sequence of Advertisement Delivery Server)

Figure 13:
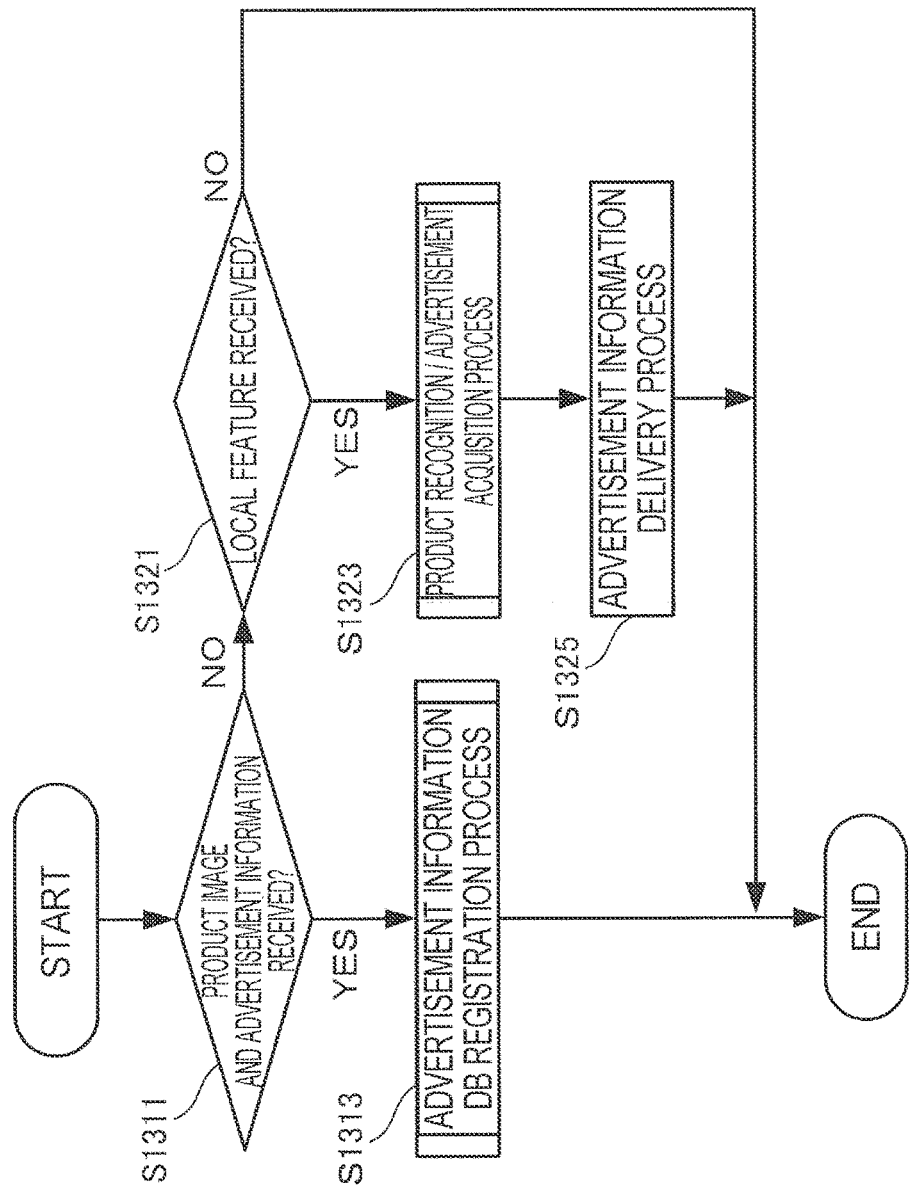
FIG. 13 is a flowchart showing a flow of processing by an advertisement delivery server relating to the second embodiment of the present invention.

FIG. 13 is a flowchart for illustrating the processing sequence of the advertisement delivery server. Firstly, in step S1311, it is determined whether or not a product image and advertisement information have been received from the advertisement provider terminal 230. If advertisement information is received, then the procedure advances to step S1313, and an advertisement information registration process is carried out in respect of the advertisement information database. On the other hand, if the local features are received from the advertisement provider terminal 230, rather than the product image and advertisement information, then the procedure advances from step S1321 to step S1323, product recognition and an advertisement acquisition process are carried out, and furthermore, in step S1325, an advertisement information delivery process is carried out.

Figure 14:
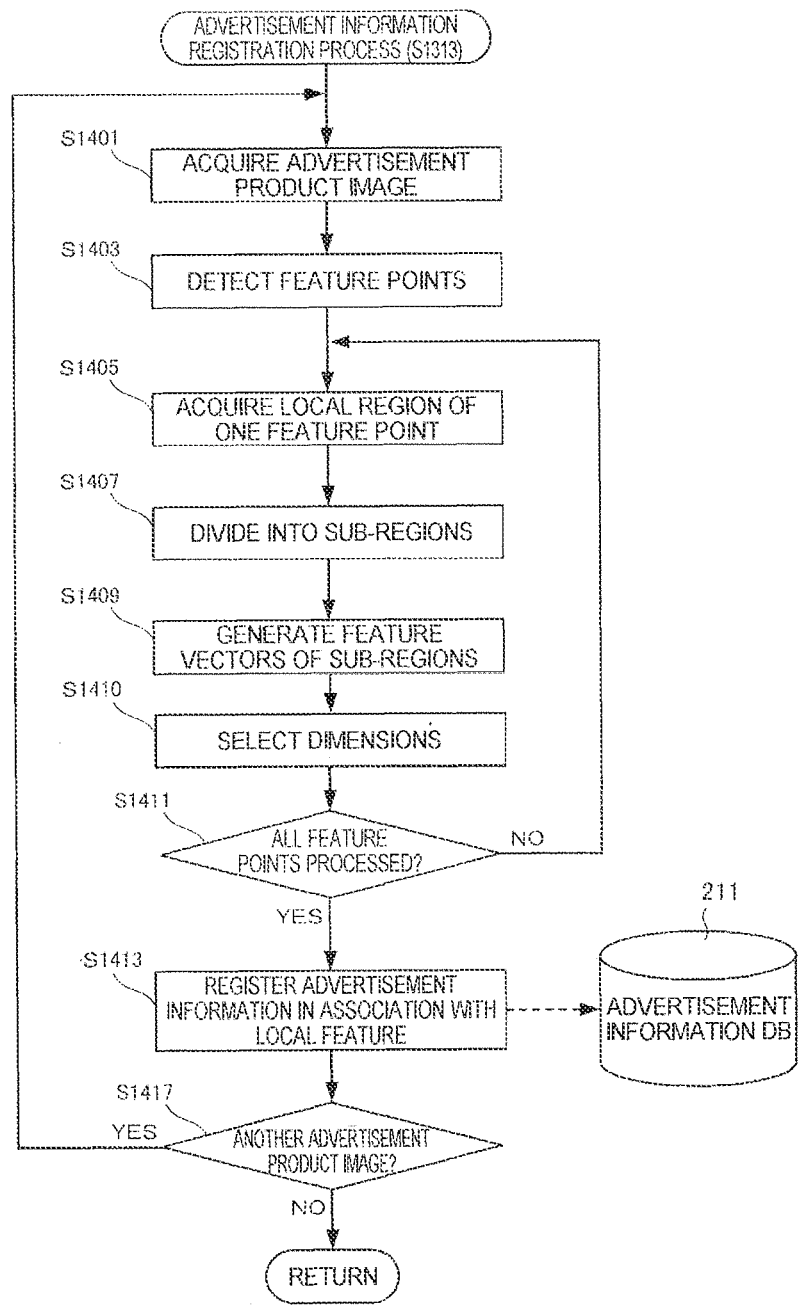
FIG. 14 is a flowchart showing a flow of processing by an advertisement delivery server relating to the second embodiment of the present invention.

FIG. 14 is a flowchart for illustrating an advertisement information registration process (S1313). In step S1401, when an image of an advertisement product is acquired, then in step S1403, firstly, the feature point detection unit 401 detects feature points. Thereupon, in step S1405, the local region acquisition unit 402 acquires a local region of one feature point. Moreover, in step S1407, the sub-region dividing unit 403 divides the acquired local region into sub-regions. In step S1409, the sub-region feature vector generation unit 404 generates feature vectors for the sub-regions. Furthermore, the dimension selection unit 405 selects the dimensions in step S1410. In step S1411, it is determined whether the dimension selection process has been completed in respect of all of the feature points, and if the process has not been completed, the procedure returns to step S1405.

If the feature generation process has been completed, then the procedure advances to step S1413 and the received advertisement information is registered in the advertisement information database 211 in association with the local feature. If there is a further advertisement product image, then the processing from step S1401 is repeated, and if there is no further advertisement product image, the processing is terminated (S1417).

Figure 15:
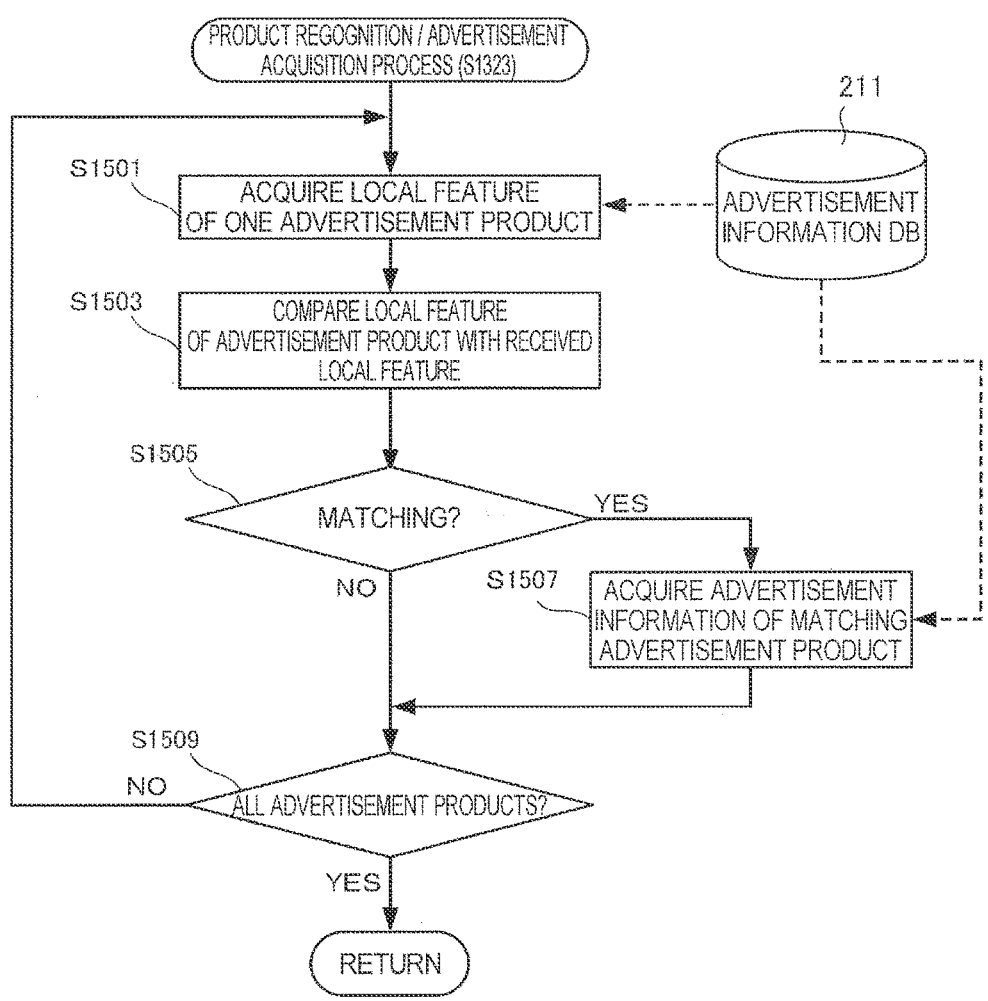
FIG. 15 is a flowchart showing a flow of processing by an advertisement delivery server relating to the second embodiment of the present invention.

FIG. 15 is a flowchart for providing a detailed illustration of a product recognition/advertisement acquisition process (S1323). Firstly, when the local features of one advertisement product are acquired in step S1501, the procedure advances to step S1503, and the local features of the advertisement product and the received local features are compared. If the comparison result indicates a match (S1505), the procedure advances to step S1507, advertisement information about the matching advertisement product is acquired, and the procedure advances to step S1509. If there is no match in step S1505, then the procedure advances to step S1509, and if processing has not been completed in respect of all of the advertisement products, then the procedure returns to step S1501.

According to the embodiment described above, it is possible to display, in real time, an advertisement relating to an object included in the image, in respect of a display image during image capture, a delivered video picture, or a reproduced image of a stored video picture.

Third Embodiment

Figure 16:
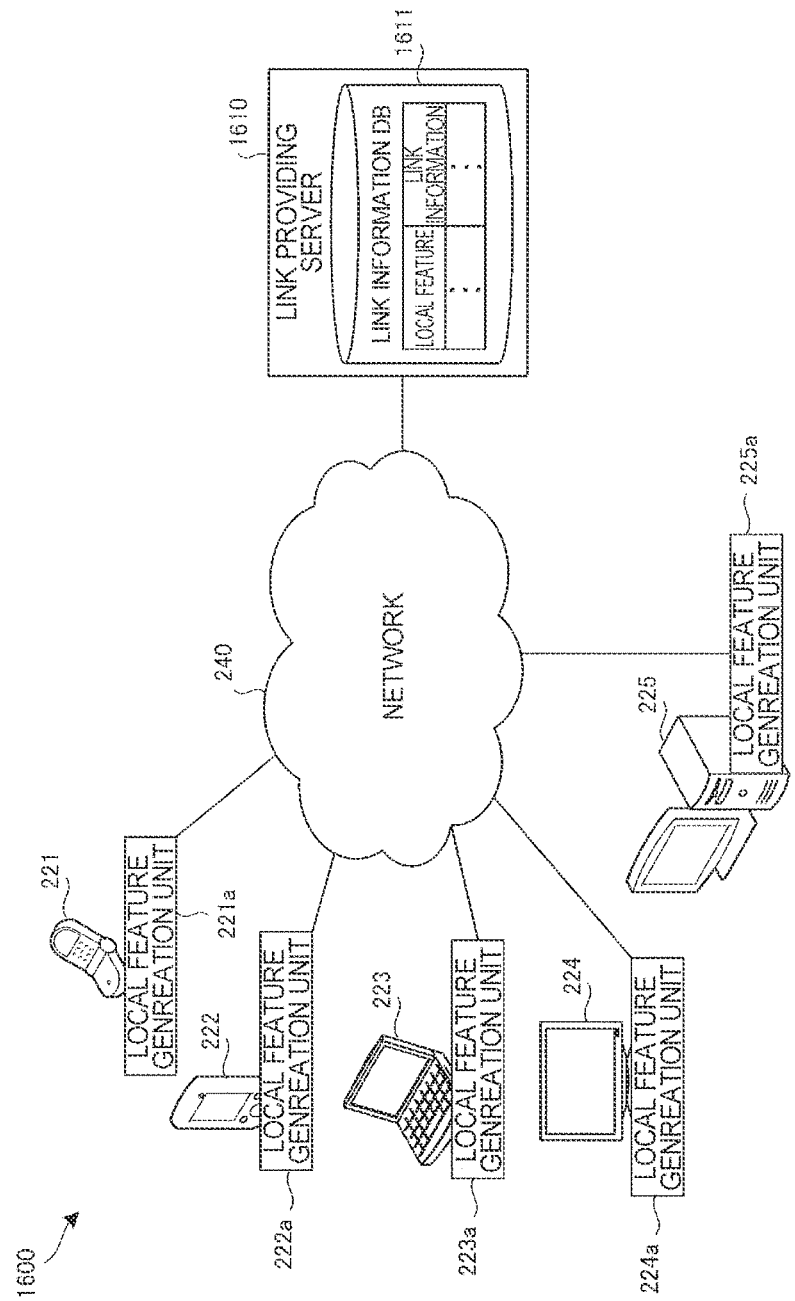
FIG. 16 is a diagram showing a general composition of an information processing system relating to a third embodiment of the present invention.

Next, an information processing system 1600 relating to a third embodiment of the present invention will be described with reference to FIG. 16 onwards. FIG. 16 is a diagram for describing the approximate overall composition of the information processing system 1600 relating to the present embodiment. When compared to the second embodiment described above, the information processing system 1600 relating to the present embodiment differs in including a link providing server 1610 equipped with a link information database 1611. The remainder of the composition and operation are similar to the second embodiment, and therefore the same composition and operations are labelled with the same reference numerals and detailed description thereof is omitted here.

The link information database 1611 stores link information in association with the local features.

Figure 17:
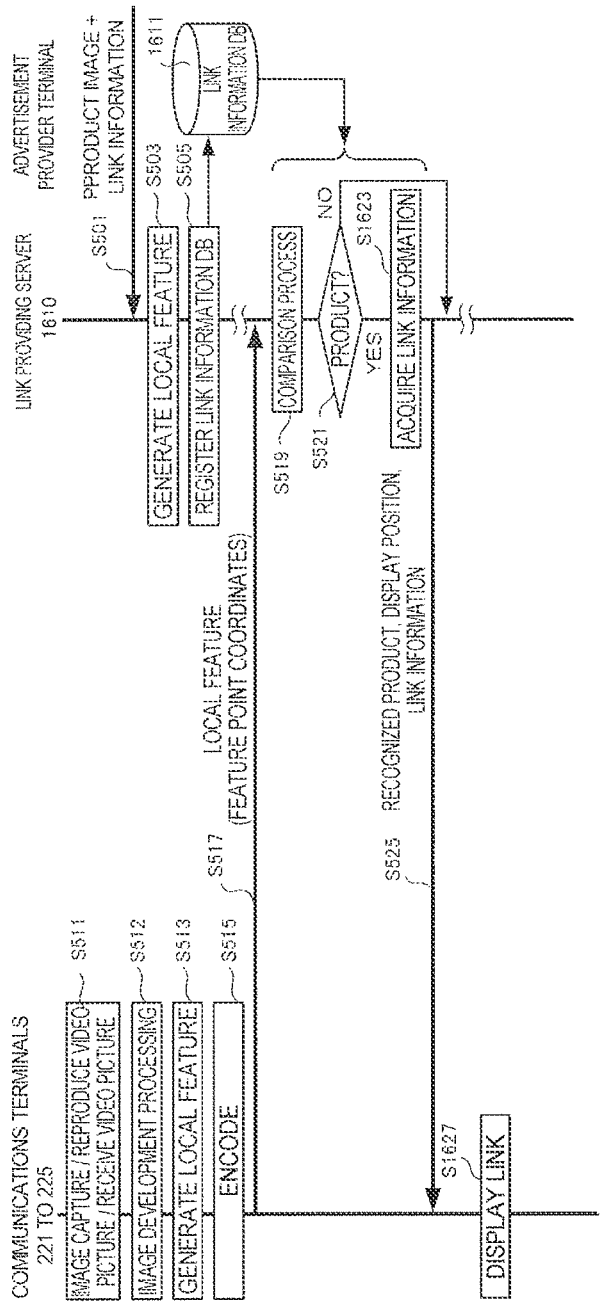
FIG. 17 is a sequence diagram showing a flow of general processing of an information processing system relating to the third embodiment of the present invention.

FIG. 17 is a sequence diagram showing the whole process of an information processing system 1600. In contrast to the second embodiment, in step S1705, link information is registered in the link information database 1611. Furthermore, in step S1623, the link information is acquired from the link information database 1611, in step S1625, this information is sent to the communications terminals 221 to 225, and in step S1627, a link to a product purchasing site, for example, is displayed in accessible fashion on the screens of the communications terminals 221 to 225. The remainder of the processing is similar to the second embodiment, and therefore the same processes are labelled with the same reference numerals and detailed description thereof is omitted here. FIG. 18 is a diagram showing the composition of a link information database 1611 and FIG. 19 is a diagram showing a transmission format 1901 of link information.

As described above, by sending link information to the communications terminals 221 to 225 and displaying this information in an accessible fashion, instead of advertisement information, it is possible to guide a user to a product purchasing site, via the link.

Fourth Embodiment

Figure 20:
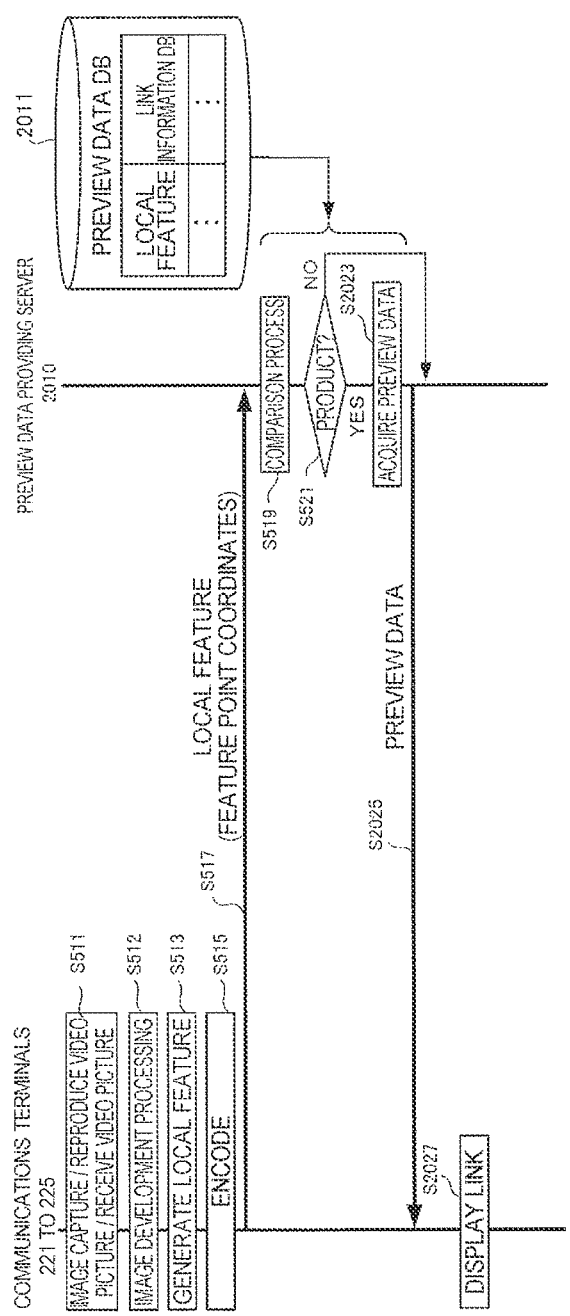
FIG. 20 is a sequence diagram showing a flow of processing of an information processing system relating to a fourth embodiment of the present invention.

Next, an information processing system relating to a fourth embodiment of the present invention will be described now with reference to FIG. 20. FIG. 20 is a diagram for describing the overall processing of the information processing system relating to the present embodiment. When compared to the third embodiment described above, the information processing system according to the present embodiment differs in including a preview data providing server 2010 equipped with a preview data database 2011 instead of the link providing server 1610 equipped with a link information database 1611. The remainder of the composition and operation are similar to the second embodiment, and therefore the same composition and operations are labelled with the same reference numerals and detailed description thereof is omitted here. In the fourth embodiment, "preview data" is provided to the user, but this "preview data" is not limited to sound data and may also include video picture data.

The preview data database 2011 stores preview data in association with the local features. The preview data corresponding to the product included in the video picture displayed on the communications terminals 221 to 225 is read out from the preview data database 2011 (S2023), sent to the communications terminals 221 to 225 (S2025) and reproduced on the communications terminals (S2027).

The remainder of the processing is similar to the second embodiment, and therefore the same processes are labelled with the same reference numerals and detailed description thereof is omitted here.

As described above, by sending link information to the communications terminals 221 to 225, instead of advertisement information, it is possible to guide a user to a product purchasing site, via the link.

Fifth Embodiment

Figure 21:
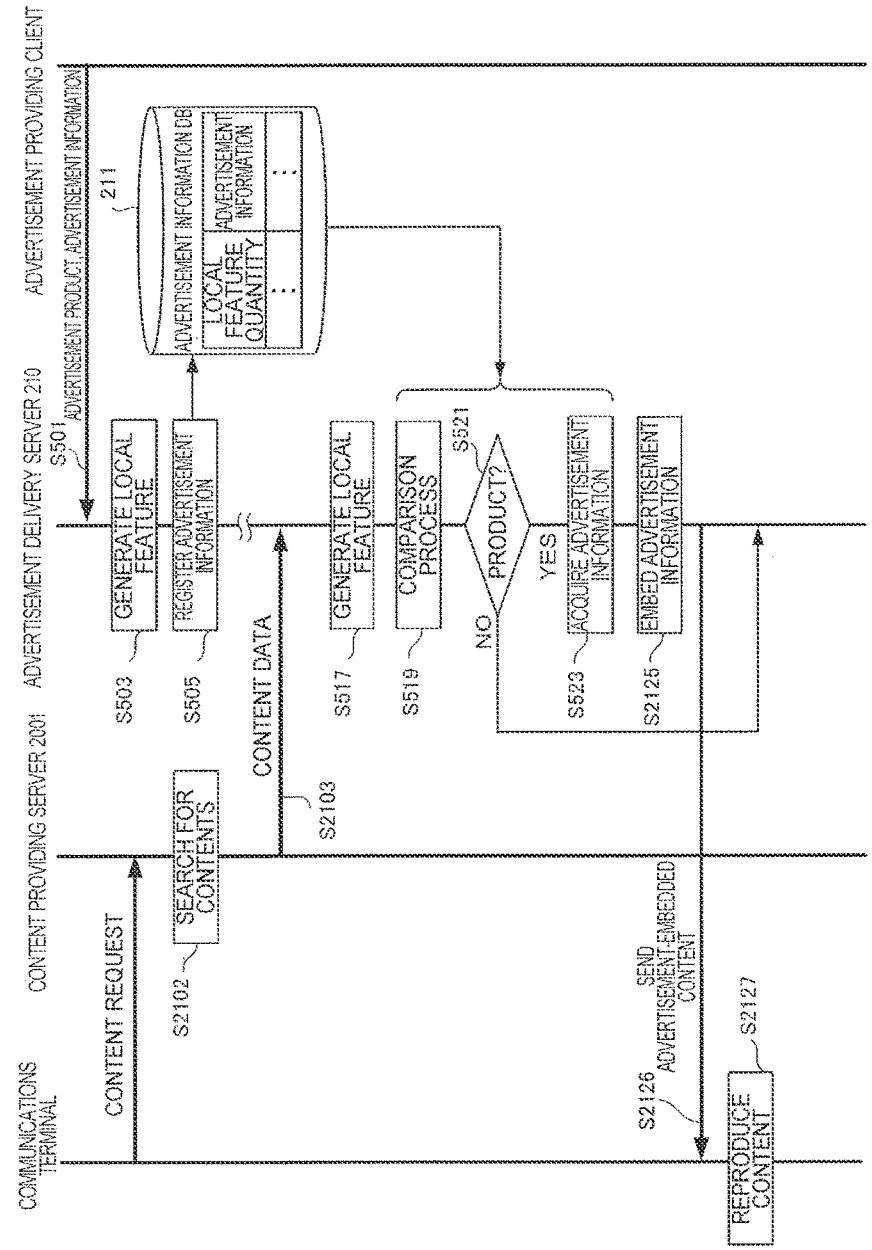
FIG. 21 is a sequence diagram showing a flow of processing of an information processing system relating to a fifth embodiment of the present invention.

Next, an information processing system relating to a fifth embodiment of the present invention will be described now with reference to FIG. 21. FIG. 21 is a diagram for describing the overall processing of the information processing system relating to the present embodiment. When compared with the second embodiment described above, the information processing system relating to the present embodiment differs in that a content providing server 2101 is added. The content providing server 2001 searches for content in respect to a content request from the communications terminal (S2102), and sends the found content data to the advertisement delivery server 210 (S2103). The advertisement delivery server 210 analyzes the received content data, derives advertisement information from the local features of the product contained therein, and embeds the advertisement information in the content data (S2125). The advertisement embedded content is sent to the communications terminal (S2126), and in the communications terminal, content in which the advertisement is embedded is reproduced (S2127). The remainder of the composition and operation are similar to the second embodiment, and therefore the same composition and operations are labelled with the same reference numerals and detailed description thereof is omitted here.

As described above, it is possible to embed an advertisement in content which is provided by the content providing server.

Sixth Embodiment

Apart from this, it is also possible to carry out evaluation of advertisements, by counting the appearance frequency of advertisements, as in the advertisement evaluation table 2212 in FIG. 22. In other words, when an advertisement or link, or the like, is displayed by the method in the first to fifth embodiments, the number of displays is counted, an evaluation according to this number is made, and payment can be made in respect of the advertisement, on the basis of this evaluation.

Other Embodiments

The present invention has been described here with reference to embodiments, but the present invention is not limited to the embodiments described above. The composition and details of the present invention can be modified variously according to the understanding of a person skilled in the art, within the scope of the invention. Furthermore, a system or apparatus which incorporates separate feature features included in the respective embodiments, in any fashion, is also included in the scope of the present invention.

Moreover, the present invention may be applied to a system constituted by a plurality of devices, and may also be applied to a single apparatus. Furthermore, the present invention may also be applied to a case where a control program for achieving the functions of the embodiments is supplied directly or remotely to a system or apparatus. Consequently, a control program which is installed in a computer in order to achieve the functions of the present invention in the computer, or a medium storing this control program, and a WWW (World Wide Web) server from which this control program is downloaded are also included in the scope of the present invention.

This application claims priority on the basis of Japanese Patent Application No. 2011-276524 filed on 16 Dec. 2011, the entirety of which is incorporated herein.

A portion or all of the present embodiments can be explained as described below, but the present invention is not limited to the following description.

Appendix 1

An information processing system, including: a first local feature storage device which stores, in association with an object, m first local features which are respectively feature vectors from one dimension to i dimensions, generated in respect of m local regions respectively containing m feature points in an image of the object;

a second local feature generation device which extracts n feature points from a video picture and generates n second local features which are respectively feature vectors from one dimension to j dimensions, in respect of n local regions respectively containing the n feature points;

a recognition device which selects a smaller number of dimensions, among the number of dimensions i of the feature vectors of the first local features and the number of dimensions j of the feature vectors of the second local features, and recognizes that the object is present in the video picture, when determination is made that at least a prescribed ratio of the m first local features which are respectively feature vectors up to the selected number of dimensions corresponds to the n second local features which are feature vectors up to the selected number of dimensions; and an advertisement information providing device which provides advertisement information relating to the object recognized by the recognition device.

Appendix 2

The information processing system according to appendix 1, wherein the first local feature storage device also stores advertisement information relating to the object after associating the information with the object; and the advertisement information providing device refers to the first local feature storage device and displays advertisement information relating to the object recognized by the recognition device.

Appendix 3

The information processing system according to appendix 1 or 2, further comprising an advertisement information addition device which adds related advertisement information to the image of the object in the video picture, when the recognition device has recognized that the object is present in the video picture.

Appendix 4

The information processing system according to any one of appendices 1 to 3, wherein the advertisement information providing device displays, as an accessible link, a link to a site for purchasing a product that is the object in the video picture, with the link serving as the advertisement information.

Appendix 5

The information processing system according to any one of appendices 1 to 4, wherein the object is a storage medium storing content including at least one of music and a video picture, and the advertisement information providing device displays in audible and/or viewable fashion a portion of content including at least one of the music and video picture, as the advertisement information.

Appendix 6

The information processing system according to any one of appendices 1 to 5, wherein the information processing system has a communications terminal and an information processing apparatus connected to the communications terminal via a communications line, the communications terminal includes the second local feature generation device and sends the n second local features to the information processing apparatus, and the information processing apparatus includes the first local feature storage device, the recognition device and the advertisement information providing device, and sends the advertisement information to the communications terminal.

Appendix 7

The information processing system according to any one of appendices 1 to 6, wherein the first local features and the second local features are generated by dividing the local regions containing feature points extracted from an image or video picture, into a plurality of sub-regions, and generating feature vectors of a plurality of dimensions which are histograms of gradient directions in the plurality of sub-regions.

Appendix 8

The information processing system according to appendix 7, wherein the first local features and the second local features are generated by selecting the dimensions having a greater correlation between adjacent sub-regions, of the generated feature vectors of a plurality of dimensions.

Appendix 9

The information processing system according to appendix 7 or 8, wherein the plurality of dimensions of the feature vectors are arranged in a cycle in the local region, for each prescribed number of dimensions, in such a manner that dimensions are selected sequentially from the dimensions contributing to the feature features of the feature points, and in such a manner that dimensions are selected sequentially from the first dimension, in accordance with increase in accuracy required in the local features.

Appendix 10

The information processing system according to appendix 9, wherein the second local feature generation device generates the second local features having a greater number of dimensions, in respect of an object having a higher correlation than another object, in accordance with the level of correlation between objects.

Appendix 11

The information processing system according to appendix 9 or 10, wherein the first local feature storage device stores the first local features having a greater number of dimensions, in respect of an object having a higher correlation than another object.

Appendix 12

An information processing method, comprising: a second local feature generation step of extracting n feature points from a video picture and generating n second local features which are respectively feature vectors from one dimension to j dimensions, in respect of n local regions respectively containing the n feature points;

a reading step of reading out, from a first local feature storage device, m first local features each comprising feature vectors from one dimension to i dimensions, with these quantities being stored in the first local feature storage device and generated previously in respect of m local regions respectively containing m feature points in an image of an object;

a recognition step of selecting a smaller number of dimensions, of the number of dimensions i of the feature vectors of the first local features and the number of dimensions j of the feature vectors of the second local features, and recognizing that the object is present in the video picture, when determination is made that at least a prescribed ratio of the m first local features which are feature vectors up to the selected number of dimensions corresponds to the n second local features which are feature vectors up to the selected number of dimensions; and an advertisement information providing step of providing advertisement information relating to the object recognized in the recognition step.

Appendix 13

A communications terminal, comprising: an imaging device which captures an image of an object;

a second local feature generation device which extracts m feature points from the image captured by the imaging device, and generates m second local features in respect of m local regions containing the respective m feature points;

a second local feature transmission device which sends the m second local features generated by the second local feature generation device to an information processing apparatus which recognizes an object contained in the image captured by the imaging device, on the basis of comparison of the local features; and an advertisement information providing device which receives advertisement information relating to the object contained in the image captured by the imaging device, and provides the advertisement information.

Appendix 14

A method of controlling a communications terminals, comprising: an imaging step of capturing an image of an object;

a second local feature generation step of extracting m feature points from the image and generating m second local features in respect of m local regions containing the respective m feature points;

a second local feature transmission step of sending the m second local features to an information processing apparatus which recognizes an object contained in the image on the basis of comparison of the local features; and an advertisement information providing step of receiving advertisement information relating to the object contained in the image, and providing the advertisement information.

Appendix 15

A control program for a communications terminal, the program causing a computer to execute:

an imaging step of capturing an image of an object;

a second local feature generation step of extracting m feature points from the image and generating m second local features in respect of m local regions containing the respective m feature points;

a second local feature transmission step of transmitting the m second local features to an information processing apparatus which recognizes an object contained in the image on the basis of comparison of the local features; and an advertisement information providing step of receiving advertisement information relating to the object contained in the image, and providing the advertisement information.

The invention claimed is:

1. An information processing system, comprising:
a communications terminal, the communications terminal comprising
a processor comprising a second local feature generation device which extracts n feature points from a video picture and generates n second local features which are respectively feature vectors from one dimension to j dimensions, in respect of n local regions containing each of the n feature points, and
a terminal communications control unit for sending the n second local features; and
an advertisement delivery server in communication with the communications terminal, the advertisement delivery server comprising
a server communications control unit for receiving the n second local features,
a first local feature storage which stores, in association with an object, m first local features that are generated in respect of each of m local regions containing each of m feature points in an image of the object and that are respectively feature vectors from one dimension to i dimensions, and
a processor which comprises
a recognition device which selects a smaller number of dimensions among the number of dimensions i of the feature vectors of the first local features and the number of dimensions j of the feature vectors of the second local features, and recognizes that the object is present in the video picture when determination is made that at least a prescribed ratio of the m first local features which are feature vectors up to the selected number of dimensions corresponds to the n second local features which are feature vectors up to the selected number of dimensions, and
an advertisement information providing device which provides advertisement information relating to the object recognized by the recognition device, wherein the server communications control unit sends the advertisement information to the terminal communications control unit of the communications terminal,
wherein the first local features and the second local features are generated by dividing into a plurality of sub-regions the local regions containing feature points extracted from an image or video picture and by generating feature vectors of a plurality of dimensions which are histograms of gradient directions in the plurality of sub-regions,
wherein the first local features and the second local features are generated by selecting the dimensions having a greater correlation between adjacent sub-regions among the generated feature vectors of a plurality of dimensions.

2. The information processing system according to claim 1, wherein
the first local feature storage device further stores advertisement information relating to the object after associating the information with the object; and
the advertisement information providing device refers to the first local feature storage device and displays advertisement information relating to the object recognized by the recognition device.

3. The information processing system according to claim 1, further comprising an advertisement information addition device which adds related advertisement information to the image of the object in the video picture, when the recognition device has recognized that the object is present in the video picture.

4. The information processing system according to claim 1, wherein the advertisement information providing device displays, as an accessible link, a link to a site for purchasing a product that is the object in the video picture, with the link serving as the advertisement information.

5. The information processing system according to claim 1, wherein
the object is a storage medium storing content including at least one of music and a video picture, and
the advertisement information providing device displays, in audible and/or viewable fashion, a portion of content including at least one of the music and video picture as the advertisement information.

6. The information processing system according to claim 1, wherein the plurality of dimensions of the feature vectors are arranged in a cycle in the local region, for each prescribed number of dimensions, in such a manner that dimensions are selected sequentially from the dimensions contributing to the feature features of the feature points, and in such a manner that dimensions are selected sequentially from the first dimension, in accordance with increase in accuracy required in the local features.

7. The information processing system according to claim 6, wherein the second local feature generation device generates the second local features having a greater number of dimensions, in respect of an object having a higher correlation than another object, in accordance with the level of correlation between objects.

8. The information processing system according to claim 6, wherein the first local feature storage device stores the first local features having a greater number of dimensions, in respect of an object having a higher correlation than another object.

9. An information processing method, comprising:
a second local feature generation step of extracting by a processor of a communications terminal n feature points from a video picture and generating n second local features which are respectively feature vectors from one dimension to j dimensions, in respect of n local regions containing each of the n feature points;
a first communicating step of sending the n second local features from the communications terminal to an advertisement delivery server;
a reading step of reading out, from a first local feature storage device of the advertisement delivery server, m first local features which are respectively feature vectors from one dimension to i dimensions, with these quantities being stored in the first local feature storage device and generated previously in respect of each of m local regions containing each of m feature points in an image of an object;
a recognition step of selecting by a processor of the advertisement delivery server a smaller number of dimensions among the number of dimensions i of the feature vectors of the first local features and the number of dimensions j of the feature vectors of the second local features, and recognizing that the object is present in the video picture when determination is made that at least a prescribed ratio of the m first local features which are feature vectors up to the selected number of dimensions corresponds to the n second local features which are feature vectors up to the selected number of dimensions;

an advertisement information providing step of providing by the processor of the advertisement delivery server advertisement information relating to the object recognized in the recognition step; and a second communicating step of sending the advertisement information from the advertisement delivery server to the communications terminal, wherein the first local features and the second local features are generated by dividing into a plurality of sub-regions the local regions containing feature points extracted from an image or video picture and by generating feature vectors of a plurality of dimensions which are histograms of gradient directions in the plurality of sub-regions, wherein the first local features and the second local features are generated by selecting the dimensions having a greater correlation between adjacent sub-regions among the generated feature vectors of a plurality of dimensions.

* * * * *